United States Patent [19]

Marazzi et al.

[11] Patent Number: 4,866,539

[45] Date of Patent: * Sep. 12, 1989

[54] COMPOSING SYSTEM INCLUDING A FOIL PRINTING UNIT

[75] Inventors: Giancarlo Marazzi, London, England; Pierre Saez, Green Brook, N.J.

[73] Assignee: Printing and Graphics Enhancement, Inc., Warren, N.J.

[*] Notice: The portion of the term of this patent subsequent to Jul. 26, 2005 has been disclaimed.

[21] Appl. No.: 223,296

[22] Filed: Jul. 22, 1988

Related U.S. Application Data

[63] Continuation of Ser. No. 934,924, Nov. 25, 1986, Pat. No. 4,760,467.

[51] Int. Cl.$^4$ .............................................. H04N 1/22
[52] U.S. Cl. .................................... 358/303; 358/296
[58] Field of Search .................... 358/256, 296, 303

[56] References Cited

U.S. PATENT DOCUMENTS 4,760,467  7/1988  Marazzi .............................. 358/303

Primary Examiner—E. A. Goldberg
Assistant Examiner—Scott A. Rogers
Attorney, Agent, or Firm—Richard C. Woodbridge

[57] ABSTRACT

A computerized composing system includes a color transfer unit for selectively coloring portions of the printed output. Initially the operator places an original piece of artwork on an optical scanning digitizer. The digitized image is stored in a computer and displayed on a monitor screen or may be created, on screen, by the operator employing various features of the system software. Letters and numbers are then added to the display screen through a computer keyboard. A mouse or the keyboard can be used to edit the graphic and alphanumeric information on the composition until it is satisfactory to the operator. Therefore, what the operator see on the screen is what the operator gets as a printed result. The composition is then transmitted to a laser printer. A color transfer unit integrated into the printer permits color to be transferred to the toner on the paper stock. A solenoid activated roller forces a web of transfer foil against the printed stock. A heated roller causes the top color layer of the web to transfer to the toner on the paper stock. Multiple colors can be produced by running the paper stock through the printer several times. The output can range in size from business cards to A4 and in colors from single color, such as black, to multiple colors.

32 Claims, 43 Drawing Sheets

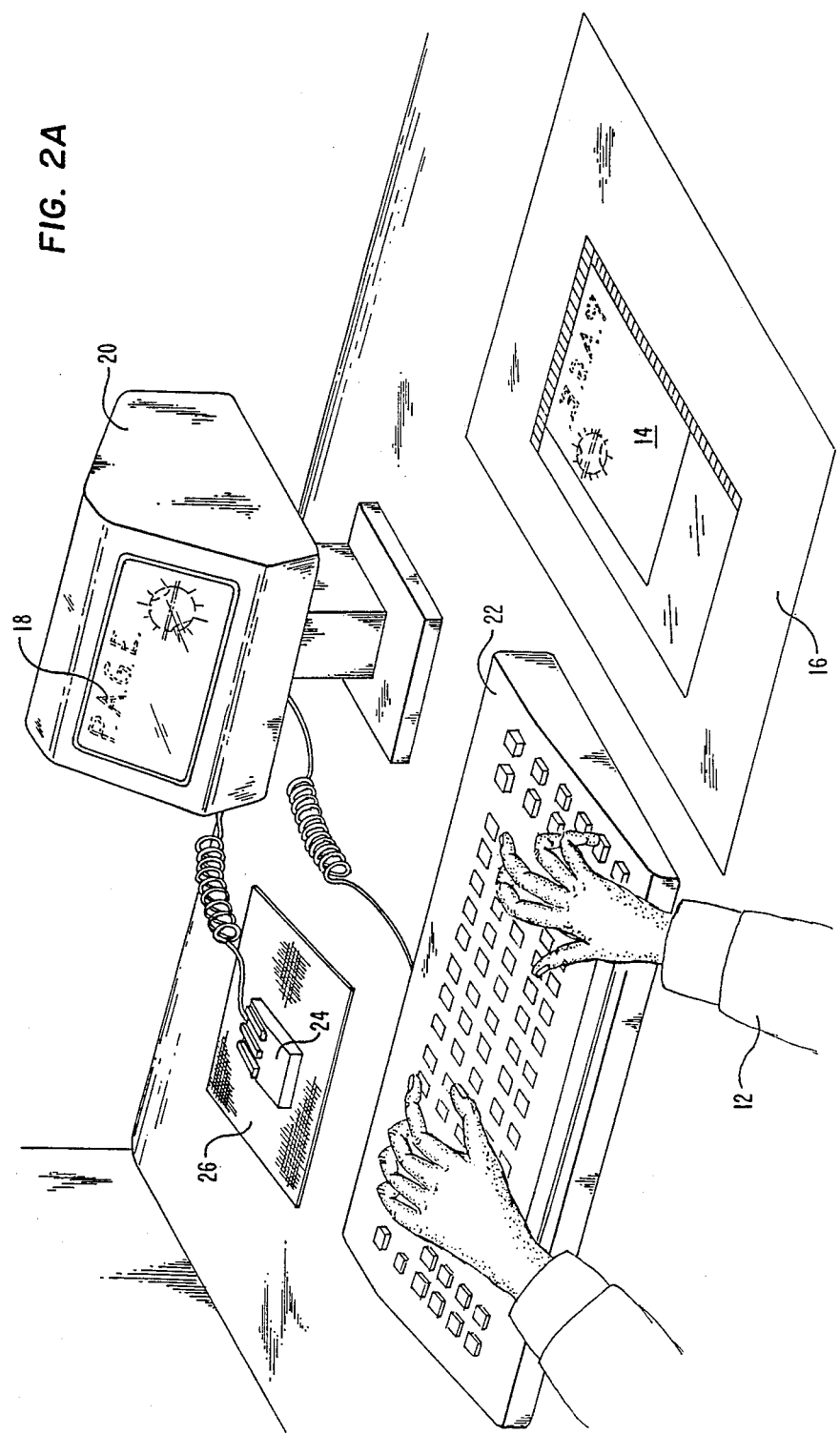

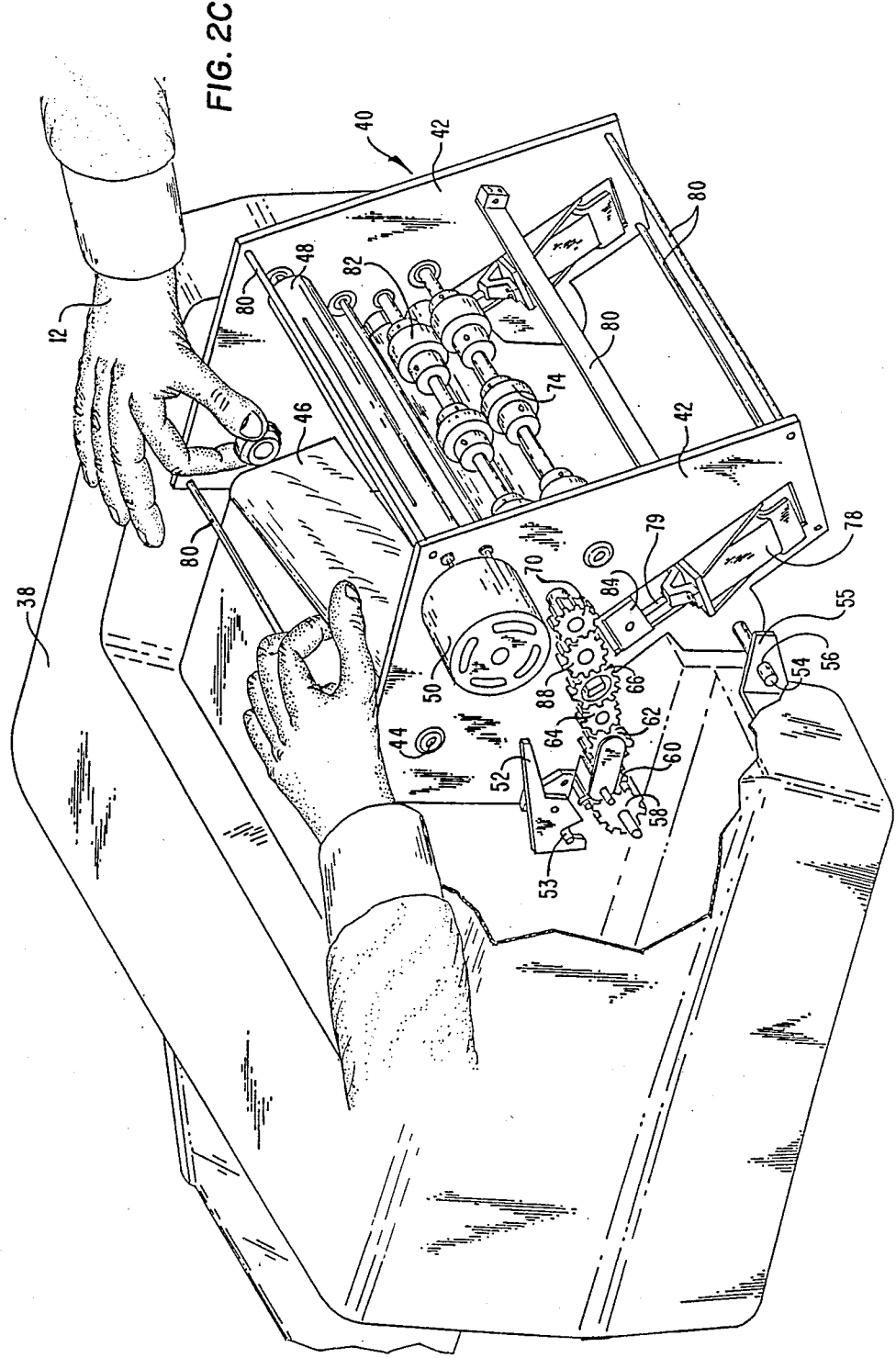

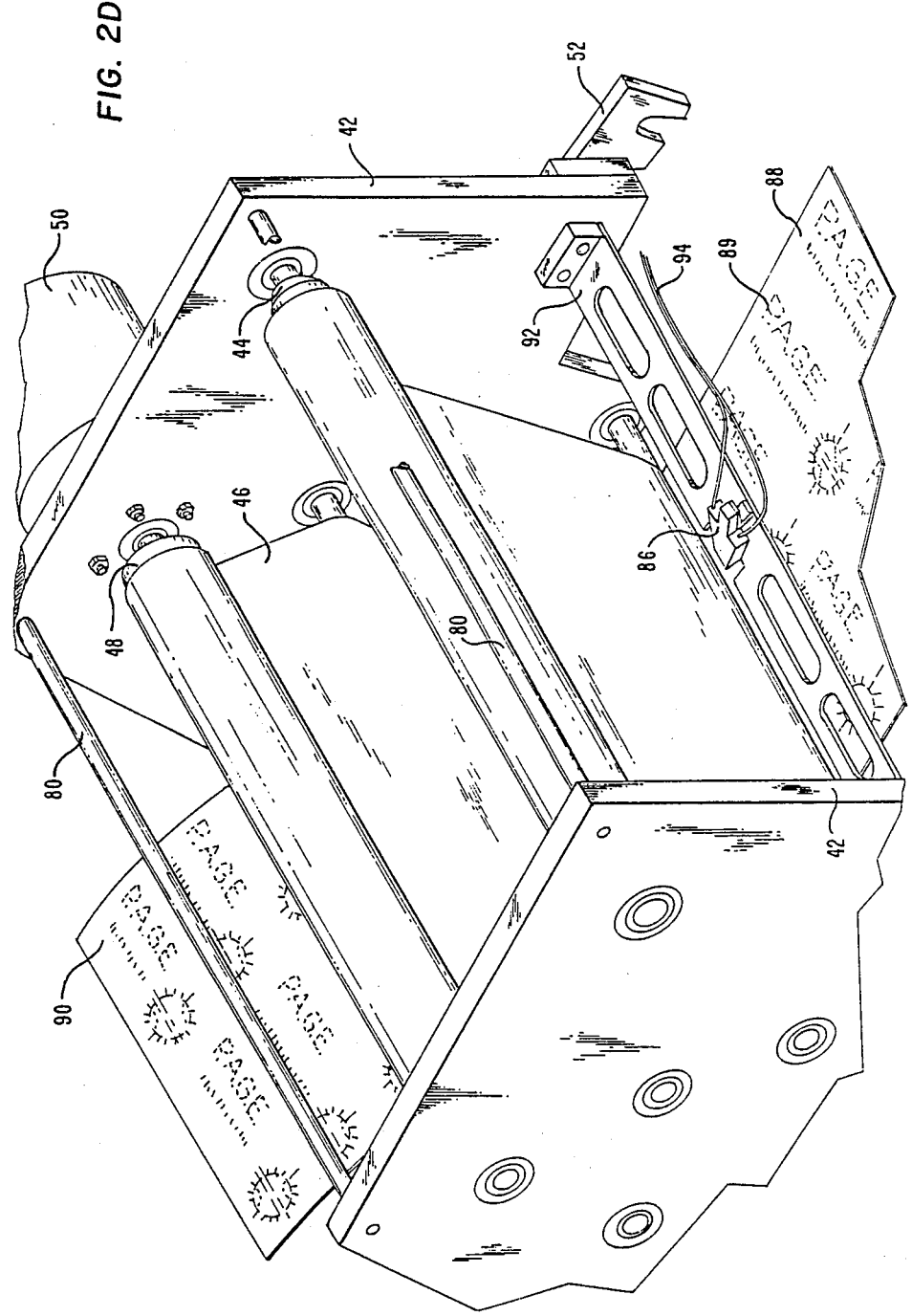

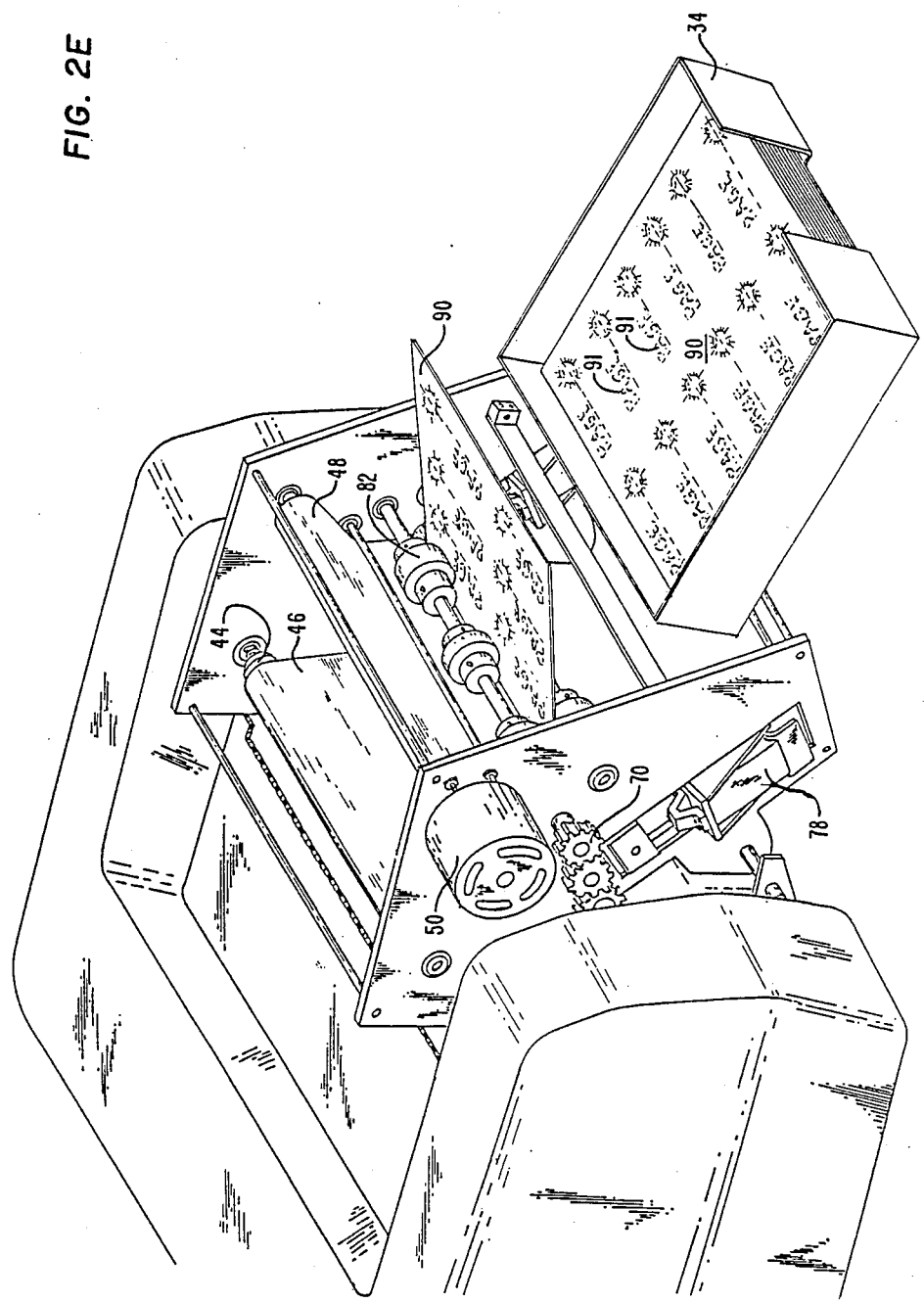

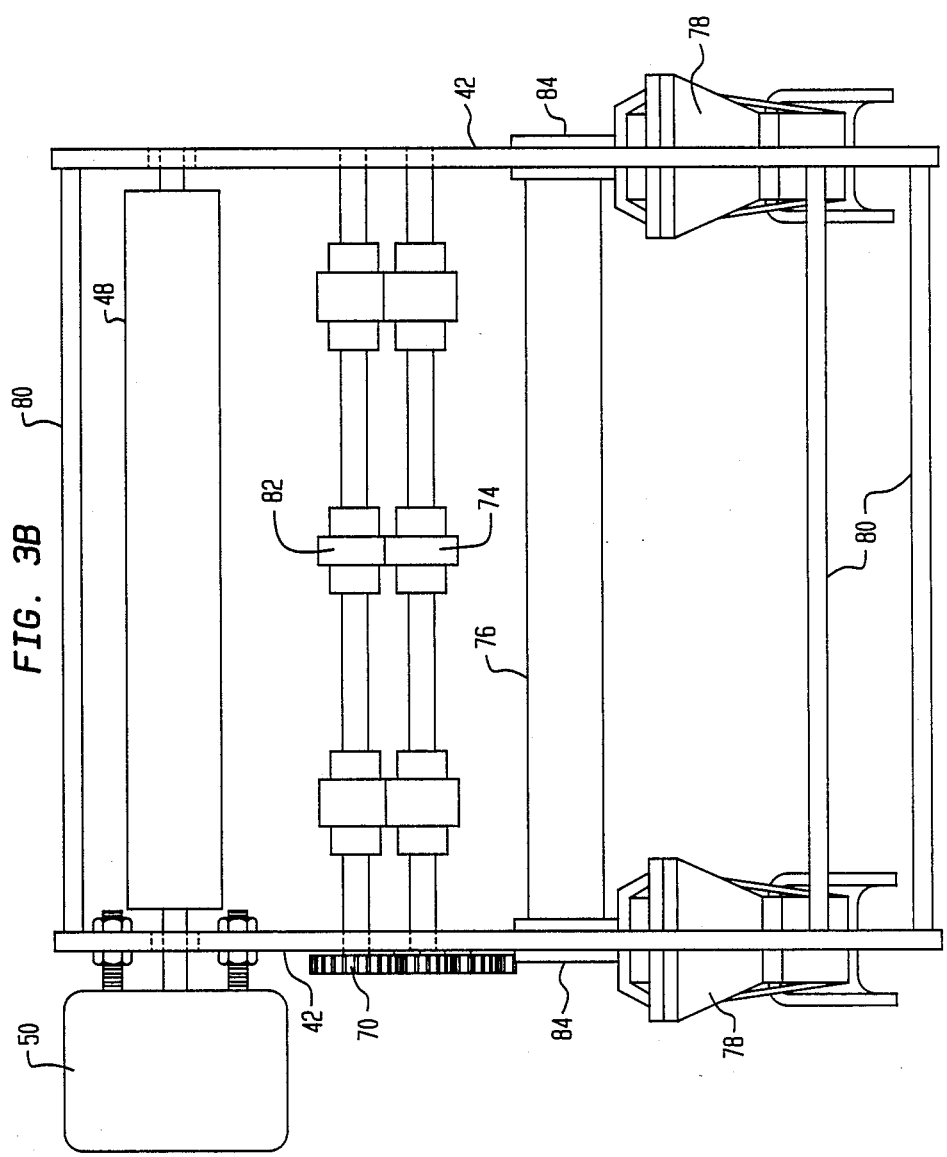

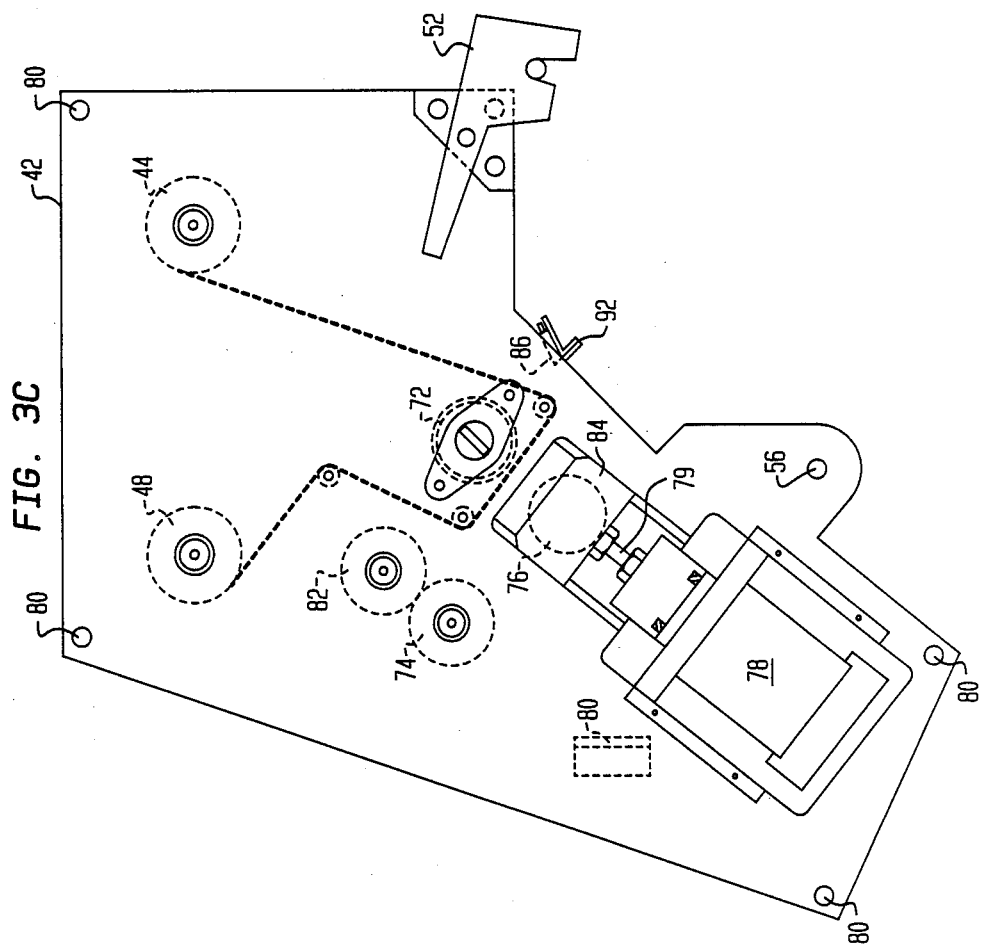

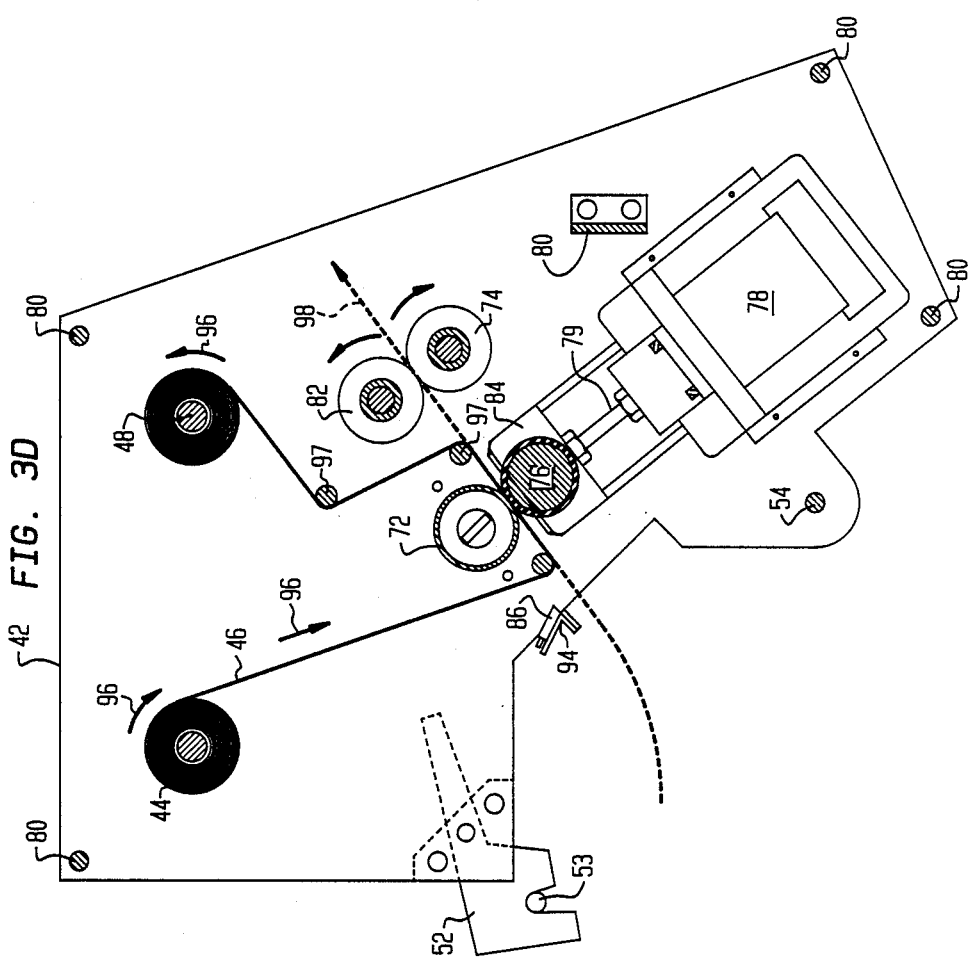

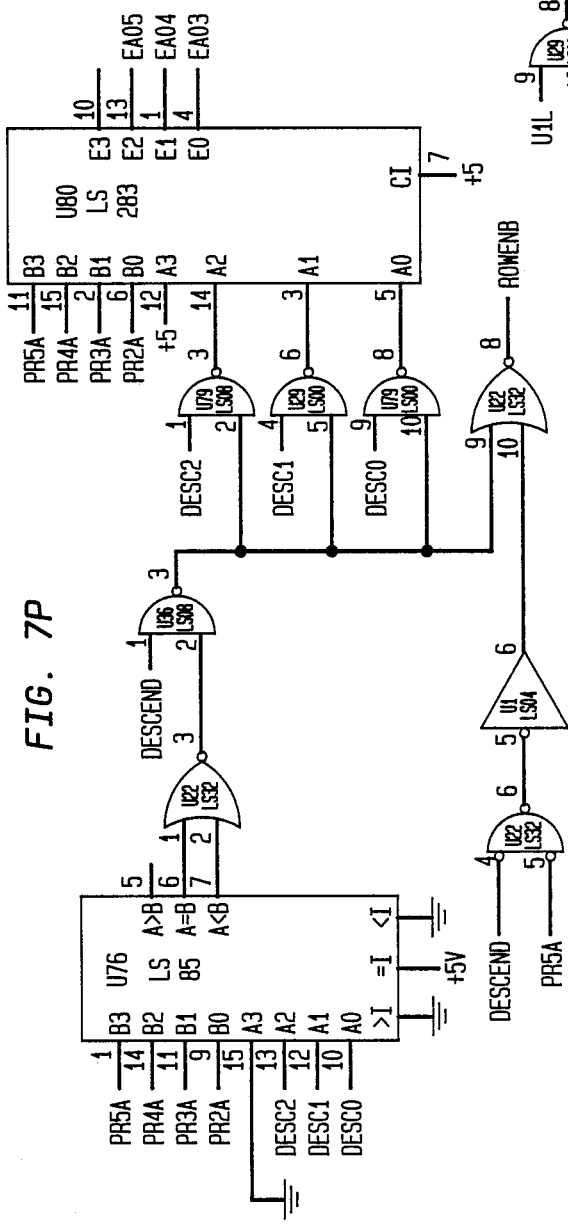
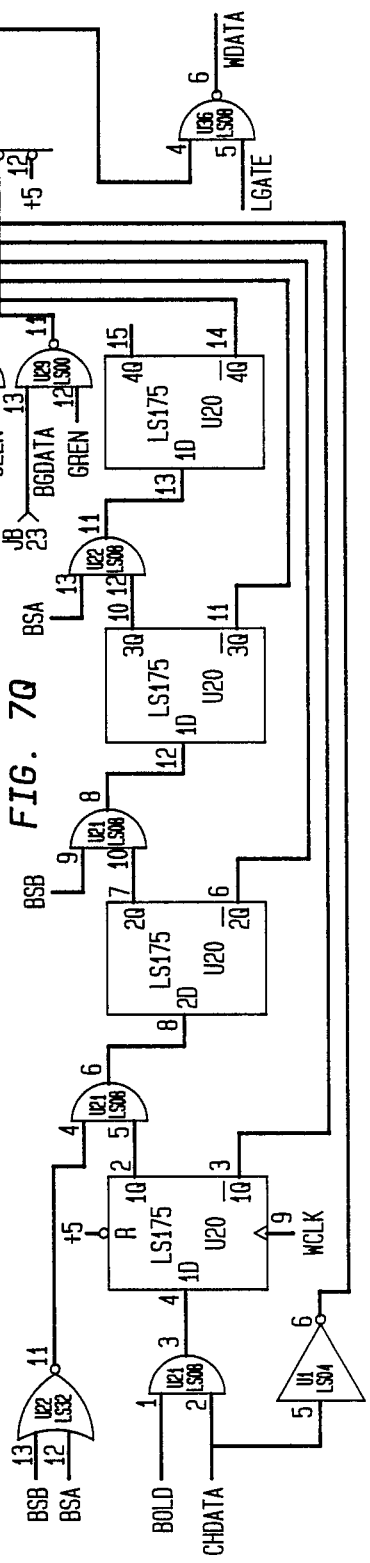
FIG. 7P
FIG. 7Q

FIG. 7ZAA

| FIG. 7Z | FIG. 7AA |

FIG. 7BBCC
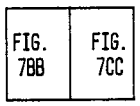
FIG. 7BB
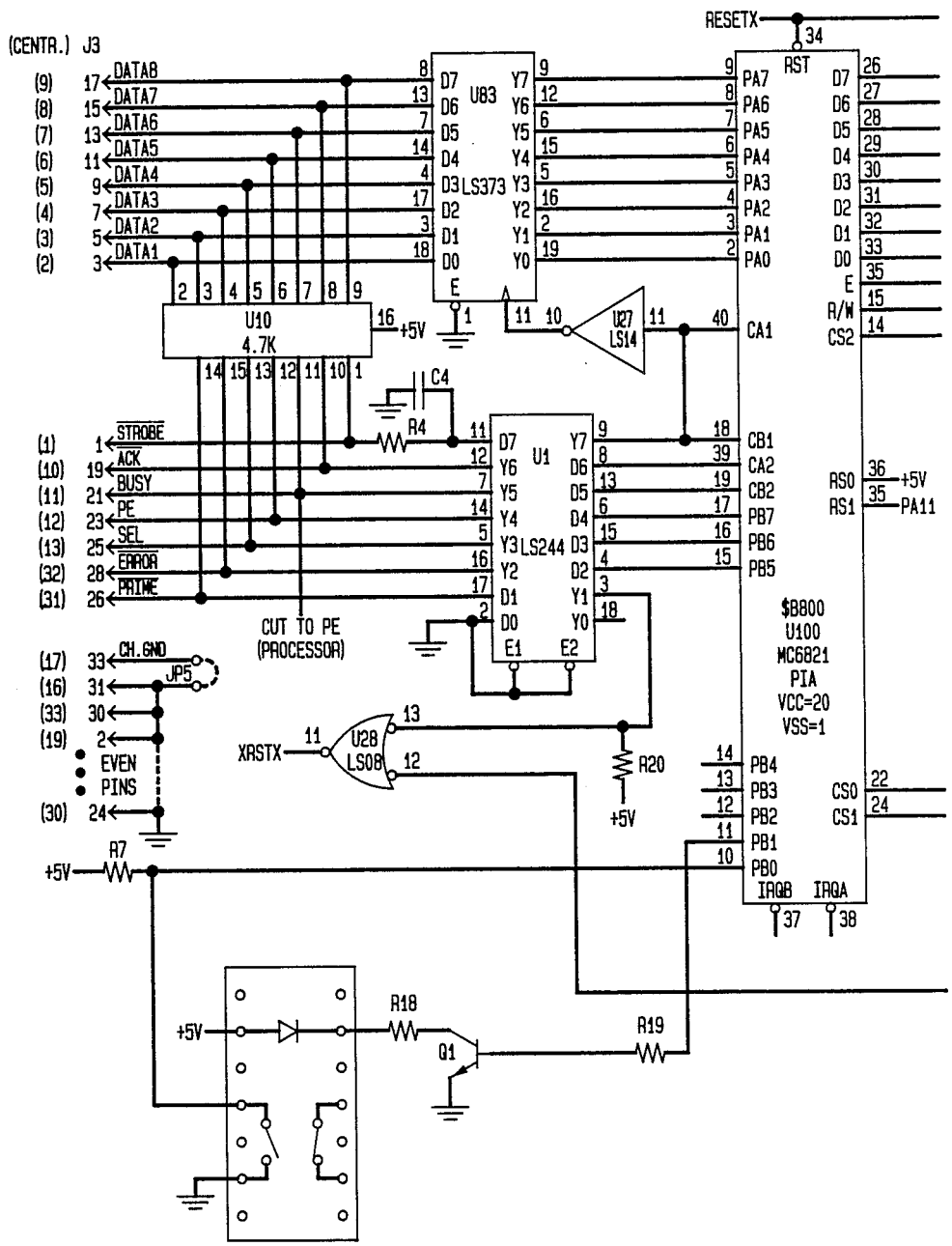

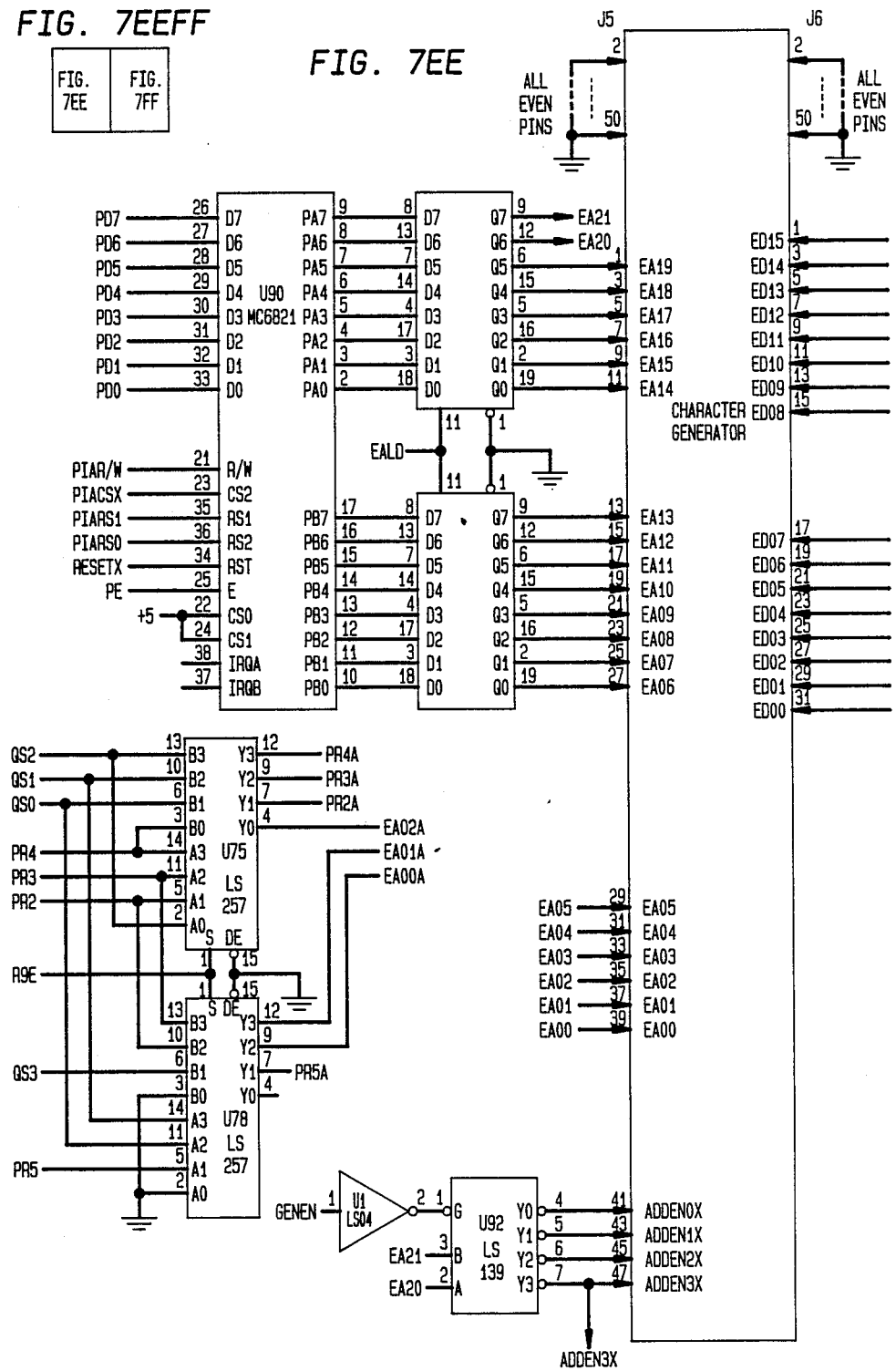

COMPOSING SYSTEM INCLUDING A FOIL PRINTING UNIT

CROSS REFERENCED TO RELATED APPLICATION

This is a continuation of Application Ser. No. 934,924, filed Nov. 25, 1986, entitled COMPOSING SYSTEM INCLUDING A FOIL PRINTING UNIT now U.S. Pat. No. 4,160,476, issued July 26, 1988. The entire contents of this copending application are hereby incorporated in total by reference to this application.

BACKGROUND OF THE INVENTION

1. Field of the Invention

The invention relates to a totally self-contained, complete printing system including a color transfer unit such that the system requires no other machinery in order to achieve its purpose.

2. Description of Related Art

Computerized composing machines are in the printing industry. Some machines, such as those disclosed in U.S. Pat. Nos. 4,196,400; 4,521,814 and 4,538,183 include the ability to scan images. Other patent disclosures of possible interest include U.S. Pat. Nos. 4,007,362; 4,051,538; 4,333,153; 4,439,790 and 4,475,162.

There also exists devices that can be used to transfer a releasable layer to a printed object. For example, U.S. Pat. No. 4,484,970 discloses a reverse process in which ink on a printed sheet prevents the adherence of foil from a transfer web. Other patents of possible relevance to that concept include: 2,770,629; 3,634,174; 3,654,016; 4,288,275 and 4,373,984. U.S. Pat. No. 3,519,512 discloses a "Method and Apparatus for Applying Designed Indicia to Articles". Ink or similar material is initially applied to an article such as a paper sheet. The printed article then passes under a heated transfer station where foil is pressed against the surface of the article bearing the ink. The heat and the pressure cause the top portion of the foil to release and stick to the ink on the article thereby transferring color to the article. That basic system has been known for several years and is available commercially as a manually operable unit. The present invention has been able to successfully automate and integrate a color transfer unit into a computerized composing system. During the prosecution of my copending application Ser. No. 934,924, the following patent references were also cited: 3,519,512, 4,240,119, 4,408,868, 4,591,904, 4,638,372, 4,641,197, and 4,642,659.

SUMMARY OF THE INVENTION

Briefly described, the invention comprises a computerized system which includes an automatic color transfer unit for selectively applying color to a printed output. Typically, an item including a customer's graphic design, is placed upon a glass plate. A scanner then digitizes the image and stores the image in computer memory. The digitized, unedited image is also displayed on the computer monitor. The scanned image may be edited, changed and otherwise manipulated, stored in part or as a whole, merged with other scanned data or other operator generated data. Letters and numbers can be added to the composition through the keyboard. The apparatus includes in its memory several groups of letter and number fonts which might be compatible with the graphics as part of the ultimate composition. The computer also includes a standard editing program that permits the graphics and alphanumeric information to be rearranged with a mouse, keyboard or other pointing device. Once the operator is satisfied with the overall composition it is transmitted to a laser printer which includes the automatic color transfer unit.

The basis laser printer is conventional but has been slightly modified for use within the system. The color transfer unit is preferably detachable from the printer itself and may be sold as an option. The purpose of the laser printer is to apply toner to paper stock or other substrate, i.e. acetate film, photographs, etc. If only one color is desired, then the paper stock is typically printed with the toner and the color transfer unit is not used. However, if the customer desires a color different from the toner or desires multiple colors, then the color transfer unit will activate. The color transfer unit is activated by software according to information input at the "set up" stage. Printed sheets from the laser printer are directed through a color transfer printing area. Transfer foil is supplied from one roll and taken up by a torque motor to tension the take-up roll. The foil passes between a stationary heated fusing roller and the printed surface of the paper stock. Pressure is selectively applied to the face of the paper stock opposite from the heated fuser roller. Whenever a foil color is required the color transfer unit senses paper entering the color transfer area and automatically causes a solenoid pressure roller to force the paper and foil against the heated fusing roller causing the outer layer of the foil to separate and adhere to the toner on the paper. If no foil color is required, the transfer unit ignores the paper sensor. The torque motor is activated by a separate timer circuit in the fuser controller which is initiated by the same paper sensing device. The torque motor activates shortly before the solenoids and stops shortly after the solenoids are disengaged. This differential timing ensures the presence of unused foil which is maintained at the correct tension. By changing the foil and printing out other selected segments on the paper during subsequent passes, it is possible to deposit multiple layers of different colors on the output product. The system can produce outputs on stock that vary from relatively thin to quite thick, from business cards size to A4 size and in monochrome or multiple colors.

These and other features of the invention will be more fully understood by reference to the following drawings.

BRIEF DESCRIPTION OF THE DRAWINGS

FIG. 2A represents an initial step of the composing process where a sheet of original artwork is scanned by a digitizing scanner.

FIG. 2C illustrates a subsequent step in which a web of color transferable material is installed on the feed roller of the color transfer unit.

FIG. 2D illustrates the manner in which the color transfer unit senses the presence of paper stock and produces a printed image thereon.

FIG. 2E illustrates the output of the color transfer unit as it deposits printed sheets in the output tray.

FIG. 3B is a rear-elevation of the output portion of the color transfer unit.

FIG. 3C is a right-side elevation of the color transfer unit.

FIG. 3D is a cross-sectional partial view showing the path of the paper and foil web through the machine.

FIG. 3E illustrates the paper path through the anti-flipping guides.

FIG. 3F is a side detail view of an anti-flip guide located between the corona charge unit and the fuser rollers.

FIG. 3G is a side detail view of an anti-flip feature located up-stream of the corona charge unit.

DETAILED DESCRIPTION OF THE INVENTION

During the course of this description, like numbers will be used to identify like elements according to the different views that describe the invention.

Figure 1:
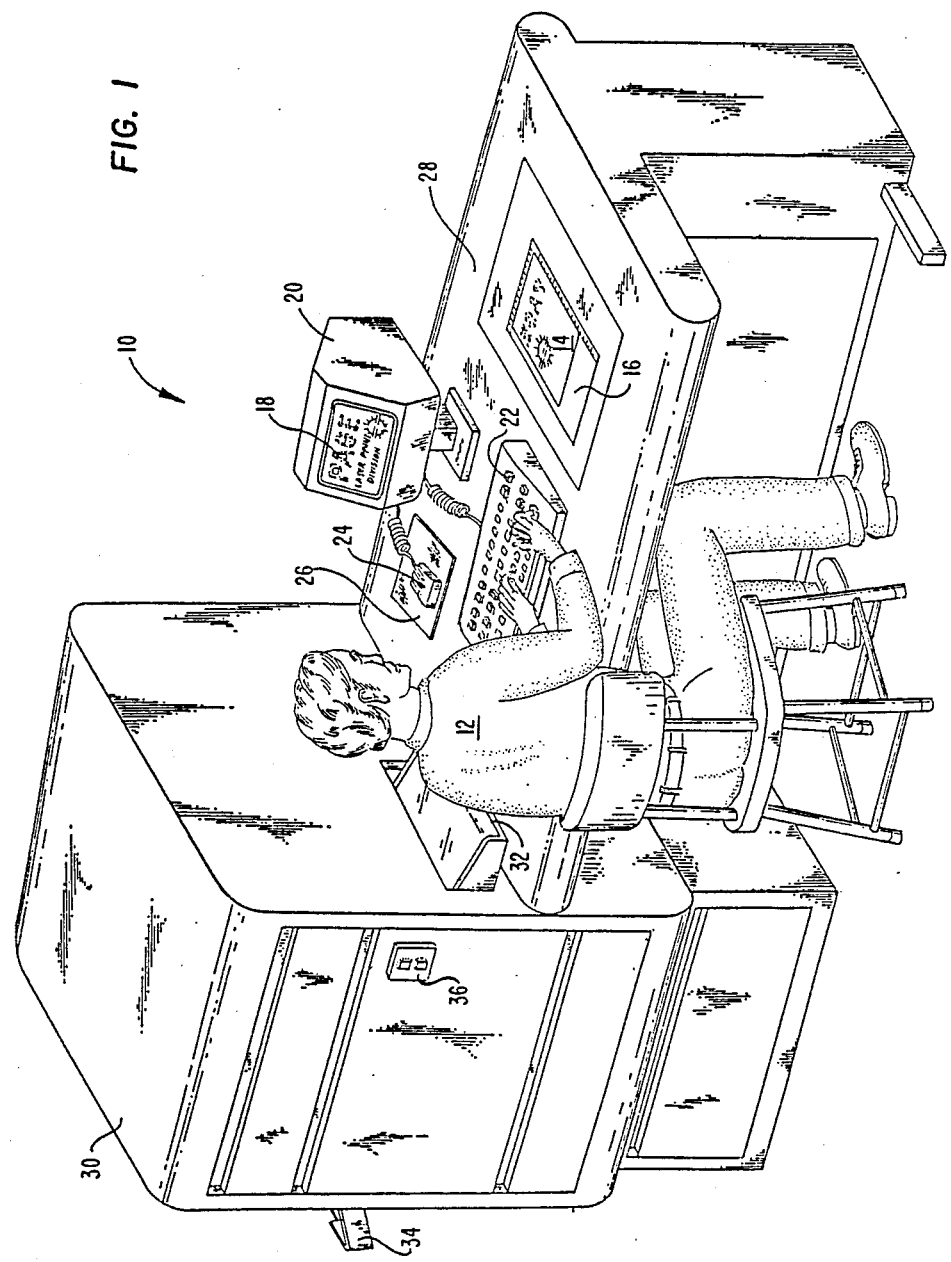
FIG. 1 is a perspective view of the present invention shown being run by a machine operator.

The composing and printing invention 10 according to the preferred embodiments thereof is illustrated in perspective view in FIG. 1. An operator 12 sits before the composing system 10 in such a location that he can easily manipulate a sheet of original artwork 14, a computer keyboard 22 and an input/output mouse 24.

Original graphic artwork 14 is placed face down on a glass plate 16 of a digitizing scanner 104. The digitized image thereof 18 is displayed by video unit 20. A pad 26 forms the surface upon which the operator 12 manipulates mouse 24. Various other pointing devices can be used also, including, but not limited to, keyboards, light pens, touch screen, etc. While the mouse 24 preferably is used in conjunction with a pad 26, there are mouses on the market which do not require pads. Console 28 contains the electronics which are described in further detail in FIGS. 5A-7FF. The laser printer 38 and color transfer unit 40 are located within cabinet 30. Paper input tray 32 is located on the side of cabinet 30 so that the operator 12 can easily change paper stocks. The printed output 90 is received in output tray 34. Control buttons 36 permit the operator 12 to separately control the operation of printer 38 and 40.

The steps involved in producing a single foil color printed output are summarized in FIGS. 2A-2E.

The first step, as shown in FIG. 2A, is to digitize the graphic information on sheet 14 and place it as a graphic image 18 on video display 20. Glass plate 16 supports artwork 14 which is placed face down above a digitizing optical scanner 104. Scanner 104 is a conventional device that can be purchased from Ricoh and slightly modified to fit within console 28. The digitized scanned graphics 18 from artwork 14 is displayed on the screen of video monitor 20. Scanning is performed from the upper right hand corner towards the bottom of glass plate 16. Scanner 104 is shown in the context of the overall electronic circuit 100 in FIG. 4. A scanner interface circuit 106 communicates between scanner 104 and computer 102. Computer 102 is a standard IBM Compatible MS-DOS microcomputer. Computer 102 includes hard disk permanent storage and sufficient random access memory [RAM] to carry on the functions of the machine 10. The circuit details of the scanner/pc interface board 106 are illustrated in FIGS. 5A-5C.

Figure 2B:
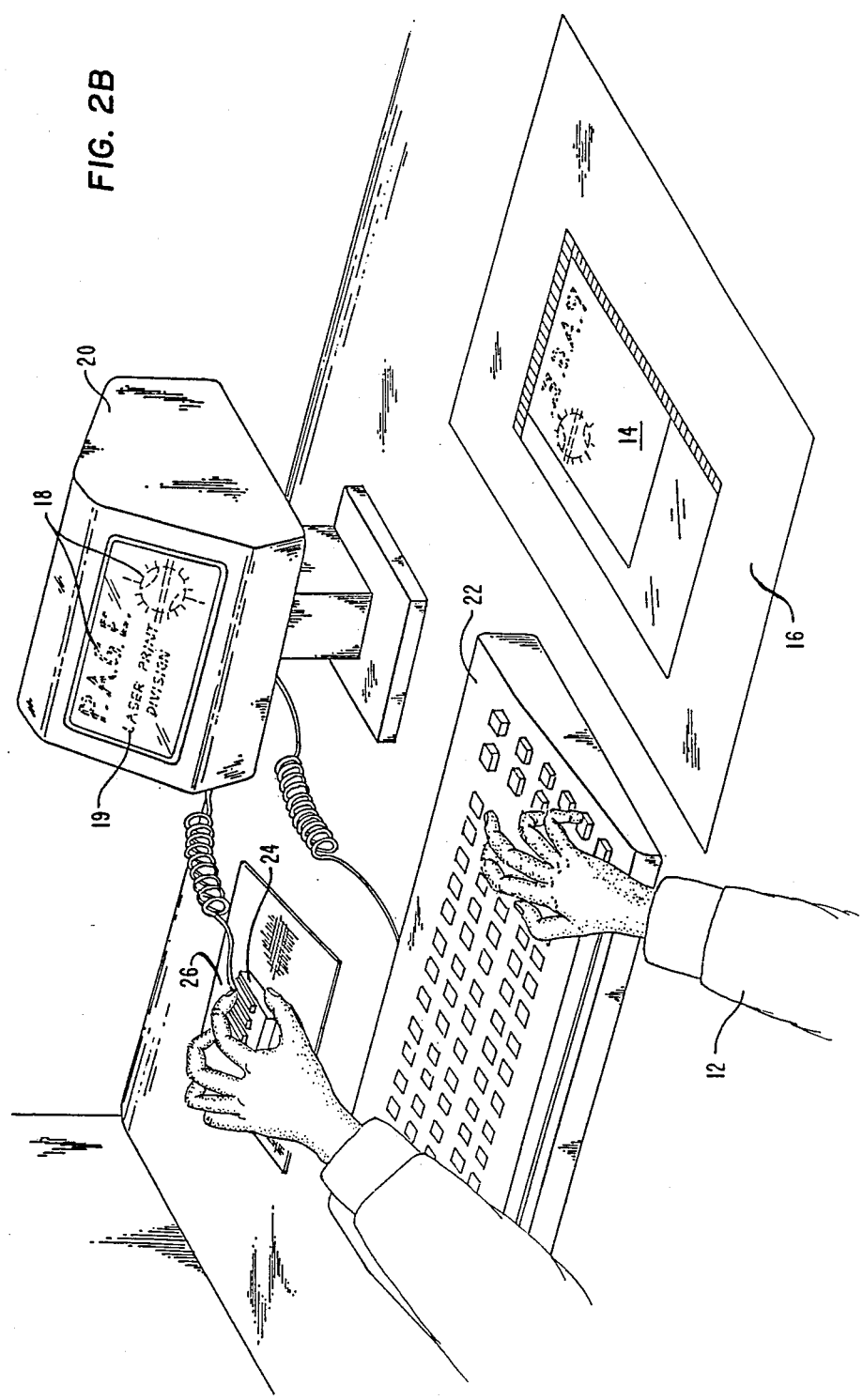
FIG. 2B illustrates the step in the composing process where additional alphanumeric information is added to the digitized graphic artwork and then edited through use of the computer keyboard and a mouse.

In the next steps, as shown in FIG. 2B, the operator 12 adds letters or numbers 19 to the graphics 18 and then edits the graphics 18 and alphanumeric information 19 until the display is in final form. The memory of computer 102 includes a plurality of standard letter and number fonts which can be incorporated into the displayed image. Software from a standard industry test editor is also included in the memory of computer 102. Mouse 24 which rests on a special pad 26 is typically used to choose displayed icons for selecting type styles and editing instructions such as "cut", "erase", etc. Once the style of the letter or number 19 is selected from the software font by mouse 26, the operator 12 then types the specific letter and number on keyboard 22 causing it to be displayed as alphanumeric image 19 on the screen of console 20. The editing software permits the operator 12 to perform many standard editing functions such as deleting portions of the display, moving portions of the display around, enlarging or decreasing the size of specific display elements, etc. Once the arrangement of the graphics 18 and the alphanumeric information 19 has been edited to the satisfaction of operator 12, then the information is ported through laser printer controller circuit 110 to laser printer 38. The subcircuitry of the laser printer controller is illustrated in FIGS. 7A-7FF. The laser printer controller circuit 110 is a standard printer controller printed circuit board adapted for use with laser printer 38. Printer 38 is a standard Ricoh printer modified to accept the color transfer unit 40. If the operator 12 only desires a single color print (i.e., monochrome) business card, then those instructions are ported to printer 38 which produces a printed output 90. Prior to printing the operator 12 places supply paper 88 in tray 32 which is located on one side of the printer cabinet 30. An output tray 34 located on the other side of printer cabinet 30 collects the printed sheets 90. As part of the set up operation, the operator 12 selects the size of the printed output. For example, it is possible to print 12 business cards on a standard $8\frac{1}{2} \times 11$ sheet. However, to be able to print on such thick feedstock, it is necessary to employ special anti-flipping guide 95A and 95B which are incorporated into the paper path 98 of printer 38. Output 90 can vary in dimension from business card size to A4. In addition, the anti-flip guides 95A and 95B permit paper stock 88 to vary in thickness from quite thin to moderately thick. Anti-flip guides 95A and 95B help prevent the trailing edge of thicker paper stock from flipping so as not to ruin the printing on the trailing edge before the toner and color has adequately set on the paper stock. As shown in FIG. 3E, the anti-flip guide 95A is located between the charged corona unit 99 and fuser rollers 105. Corona unit 99 includes a standard corona charge wire 101. Guide 95A is reshaped to prevent depression of the paper as it feeds towards the fuser rollers 105. More controlled paper flow prevents unwanted paper movement "flip-up". Anti-flip guide 95B is located up-stream of the corona charge unit 99. A block of material 107 extends below the lower guide thereby providing additional strength and accordingly, affording more support to the paper stock. The upper guide 111 includes an extension 109 that controls the leading edge of the paper as it travels along path 98 and before it makes contact with OPC belt 103. Anti-flip guides 95A and 95B are believed to be novel in the context of laser printers. The problem is that thick paper tends to resist smooth flow along paper travel path 98. As the paper travels along path 98 between upper and lower guides 111 and 113, it tends to pivot at the point where it would make contact with OPC belt 103. At that point, the paper, without the appropriate guiding, would tend to dip and flip up as it exits the guides 111 and 113. Extension 109 prevents the paper from flipping up as it travels along path 98. Normally, flip-ups cause uneven toner transfer between the OPC belt 103 and the paper. By adding guide extensions 107 and 109, the flip-up is largely eliminated. Subsequent flip-up is further minimized by the reshaping of guide 95A so as to prevent unwanted paper movement prior to fusing of the toner by conventional fuser rollers 105.

Figure 3A:
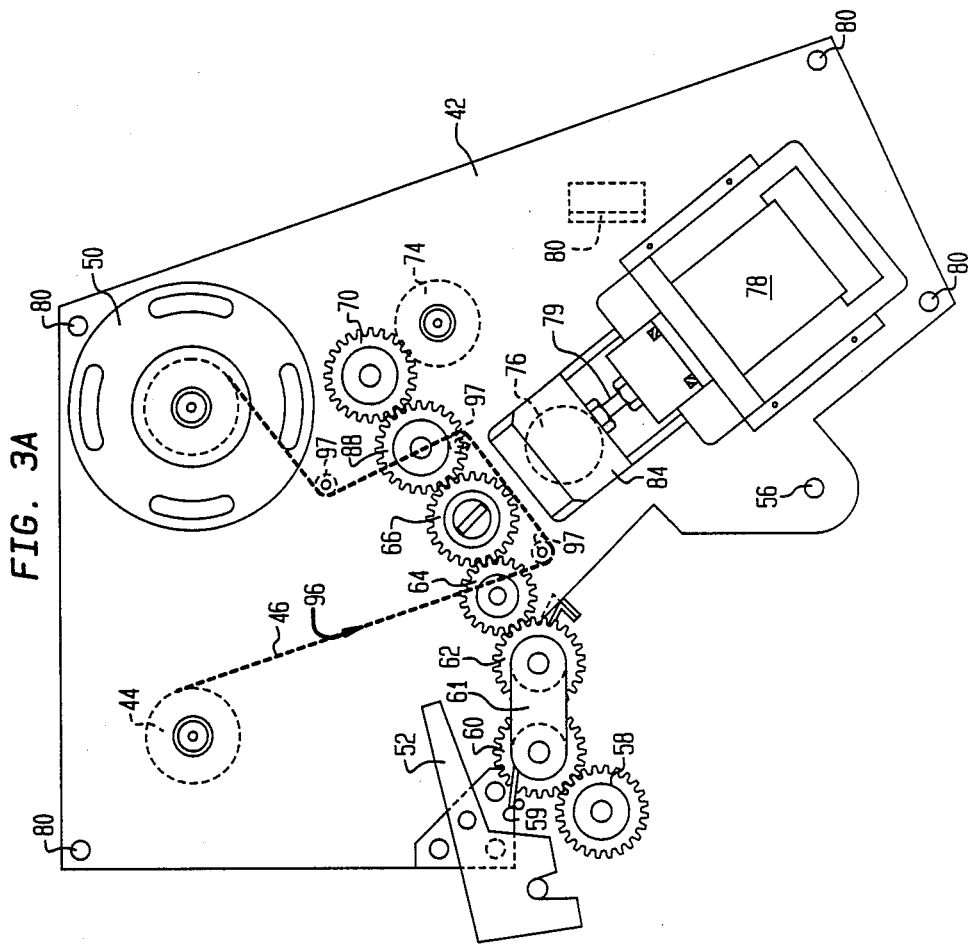
FIG. 3A is a left-side elevated cross-sectional view of the color transfer unit.

If the operator 12 wishes to add one or more colors to the output, then it is necessary to activate the color transfer unit 40 as shown in FIG. 2C. Initially, the operator 12 places a roll of transfer foil 46 on loading roller 44 which is supported between end panels 42. Foil 46 is wound around foil web guide rollers 97, illustrated in FIG. 3A, and are taken up on take-up roller 48. The direction 96 of web 46 is shown in FIGS. 3A and 3D. Take-up roller 48 includes a torque motor 50 that keeps tension on the foil web 46 thereby maintaining it relatively taut during processing. Motor 50 also serves to index the web forward during the printing operation.

Color transfer unit 40 is preferably pivotably attached to laser printer 38. A bracket 55 permanently attached to the chassis of laser printer 38 includes an aperture 56 for receiving a pin 54 attached to each end plate 42 of the color transfer unit 40. A lever type latch 52 attached to both end plates 42 can selectively engage and disengage a locking pin 53 connected to the frame of laser printer 38. When it is necessary to get into the machine, the operator 12 merely releases latch 52 from pin 53 and pivots the unit 40 about pin 54. Laser printer 38 includes a motor driven drive gear 58 which selectively engages with the gear train of color transfer unit 40. The gear train of color transfer unit 40 includes driven gear 60, spring loaded transmission gear 62, idler gear 64, heat fusing roller drive gear 66, idler roll 88 and pull out roller drive gear 70. Driven gear 60 is attached by a movable link 61 to spring loaded transmission gear 62. A coil spring 59 provides tension so that the driven gear 60 easily engages and disengages drive gear 58 when the unit 40 is pivoted into and away from the laser printer 38. Idler gear 64 transmits power from transmission gear 62 to the stationary heated fusing roller drive gear 66. Transmission gear 62 disengages drive gear 58 from idler gear 64 in the event of a paper jam where there is an interruption or error in the feeding of paper or foil in the machine. Fusing roller 72 includes a conventional heater element therein for bringing it to a temperature sufficient to cause the top layer of foil 46 to transfer to the toner 89 on the feed paper 88 under the influence of the pressure roller 76. Another idler gear 66 transmits power from fuser drive gear 66 to upper pull out roller drive gear 70. Upper pull out drive gear 70 drives upper pull out roller 82. Because of the pressure between upper pull out roller 82 and lower pull out rollers 74, the lower pull out roller 74 will revolve along with the rotation of upper pull out roller 82. All of the elements of the gear drive train are mounted on both end plates 42 which in turn are held in position by a plurality of connecting support rods and cross brackets 80.

The stationary heated fusing roller 72 is adapted to selectively mate with movable rubber pressure roller 76. Rubber pressure roller 76 is mounted on a slidable block 84 which is connected by plunger rod 79 to solenoid 80. Activation of solenoid 78 causes the pressure roller 76 to force paper 88 and toner 39 into intimate heated contact with foil web 46. The releasable color top layer of the foil 46 releases and attaches itself to the toner 89 under the influence of the heat and pressure from rollers 72 and 76. Solenoid 78 is activated by a paper presence detecting switch 86 mounted on crossbracket 92 between end plates 42. Wire leads 94 connect the paper sensing switch 86 to a timer circuit in the color transfer fuser controller board 112. Paper sensor switch 86 is preferably a conventional photocell/light combination which detects the presence of incoming paper sheet 88 with a light beam. However, switch 86 could be replaced by a conventional mechanical limit switch or the like. The built-in timing unit in the transfer control fuser circuit 112 causes the solenoid 78 to activate bringing the rubber pressure roller 76 into contact with heated fusing roller 72 with the foil 46 and paper 88 sandwiched in between. The conventional built-in timing circuit keeps roller 72 and 76 in pressurized heated contact for a predetermined period of time after which the solenoid 78 is turned off and the pressure roller 76 returns to its normal relaxed, unengaged position. The speed of the color transfer unit 40 is constant so that the timer can be set to ensure that constant pressure will be applied to the entire surface of the sheet 88. During the color transfer process, the sheet follows path 98 shown in FIG. 3D. The printed sheet 90 that emerges between pull out rollers 74 and 82 includes the colored transferred printing 91 on the surface thereof. As shown in FIG. 2E, the output collecting tray 34 catches the printed sheets 90 as they emerge between pull out rollers 74 and 82.

In operation, the operator 12 must first enter into the computer the details of the job about to be printed. Such details typically might include format (e.g. business cards), number of colors, types of foil in use and quantity required, etc. If only the toner color is required, a "No Foil" selection is made by the operator 12. If more than one color is required, the software automatically creates one file for each color element plus a composite file for the whole job.

The operator 12 next feeds the correct paper stock into the feed tray 32 and loads the correct foil 46 into the color transfer unit 40 as shown in FIG. 2C. The operator 12 then instructs the computer to transfer composition to the laser printer 38 which then prints out the contents of the job file. As the paper 88 passes the paper sensor 86, a signal is sent to the laser printer 38 and to the fuser controller circuit 112 simultaneously. The fuser controller 112 determines automatically whether color transfer is required. If no color transfer is required, the solenoids 78 do not activate and the torque motor 50 remains stationary and a nominal temperature is maintained in the feeder roller 72 of the color transfer unit 40. If color is required, the fuser controller 112 automatically maintains the correct heated roller temperature for the foil 46 in use. Each foil 46 has an ideal operating temperature. When the paper 88 passes the paper sensor 86, the fuser controller circuit 112 activates the torque motor 50 which immediately takes up any slack in the foil 46. An instant later, the solenoid 78 is activated and color transfer takes place. After a predetermined time has elapsed, the solenoids 78 disengage. Immediately afterward, the torque motor 50 stops. The paper is then pulled through the output rollers 74 and 76 and drops into the output tray 34.

When more than one color is required on any one job, the foil 46 is changed between each "job file transfer". The fuser controller circuit 112 automatically readjusts temperature and timings according to the job specification. The fuser controller circuit 112 automatically controls the length of time the solenoids 78 and the torque motor 50 are in operation. Typically a letterhead requires that only apart of a page is printed. When printing a letterhead the fuser controller circuit 112 activates the solenoids 78 and the torque motor 50 for no longer than is required to ensure complete color transfer over the printed area.

If the operator 12 requires three colors, i.e., two foils and one toner, four job files would automatically be created by the system. Those job files are identified as follows:

Job File 1—Composite of complete job
Job File 2—First color
Job File 3—Second color
Job File 4—Toner color The operator 12 selects the first foil 46 and loads the color transfer unit 40. The correct paper stock 88 is loaded into the tray 32 and the system is instructed to print the job file containing the first color image (job file 2 above). The laser printer 38 then transfers toner to the required area. Subsequently the top layer of the foil 46 is automatically transferred to the toner by the color transfer unit 40 thereby creating a first color image on the paper.

The operator 12 next takes the printed paper 90, colored with the first color from the output tray 34 and places it back into the feed tray 32. The operator 12 then changes foil 45 and selects the next job file (e.g., Job File 3 above) to be transmitted and initiates the process on the computer to cause the printing of the second foil color. The second foil color is transferred into the new toner and the cycle is repeated for the third color (Job File 4 identified above) which is to be the toner only. In this case the operator 12 needs only to place the paper 90 back into the feed tray 32 and transmit the last part of the job which is the "No Foil" job file. The laser printer 38 transfers the toner according to the composition stored in the job file. The fuser controller 112 automatically ignores the signal from the paper sensor 86 and the solenoids 78, torque motor 40 and the heater elements 72 are not activated so that the paper 90 emerges only with the toner color and without an additional foil color transfer. The three color job is now complete.

The operator 12 may select any number of color combinations and enter them into the set-up routine. The color transfer unit 40 will then be under full automatic software control requiring no operator 12 action other than to change foil colors between printing runs. In general it only takes a minute or two for the operator 12 to add additional color foils 46 to the process. The toner employed in the color transfer process is commercially available as are the color transfer delamination foils 46.

Figure 4:
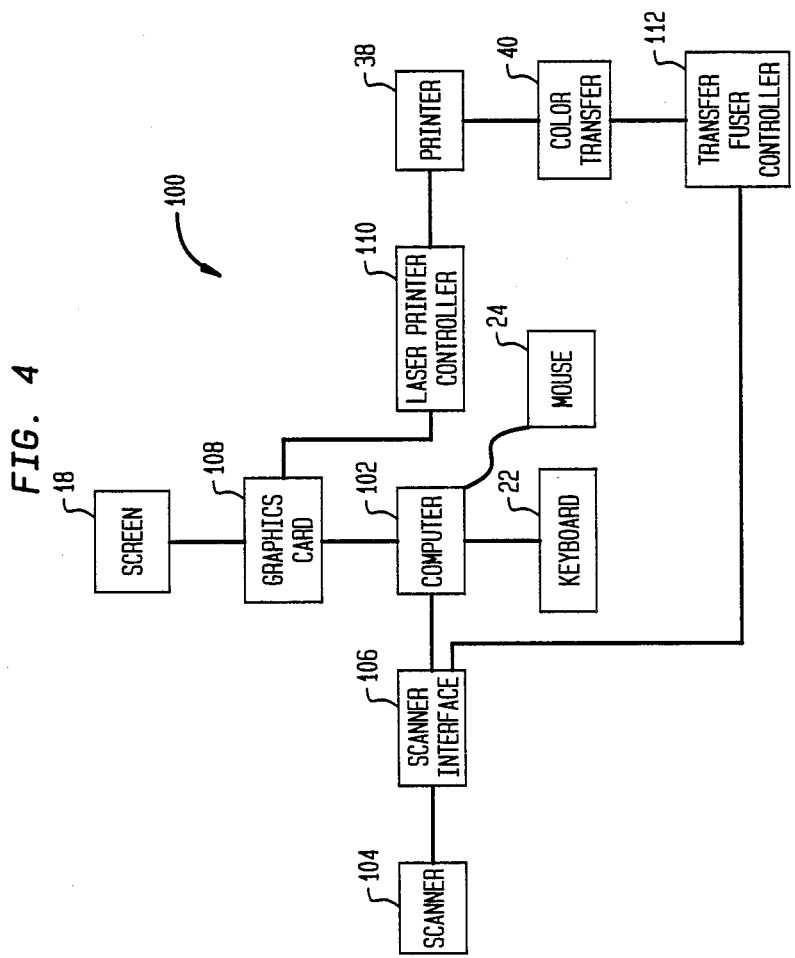
FIG. 4 is a block diagram which schematically describes the major electronic components of the invention.
Figure 5A:
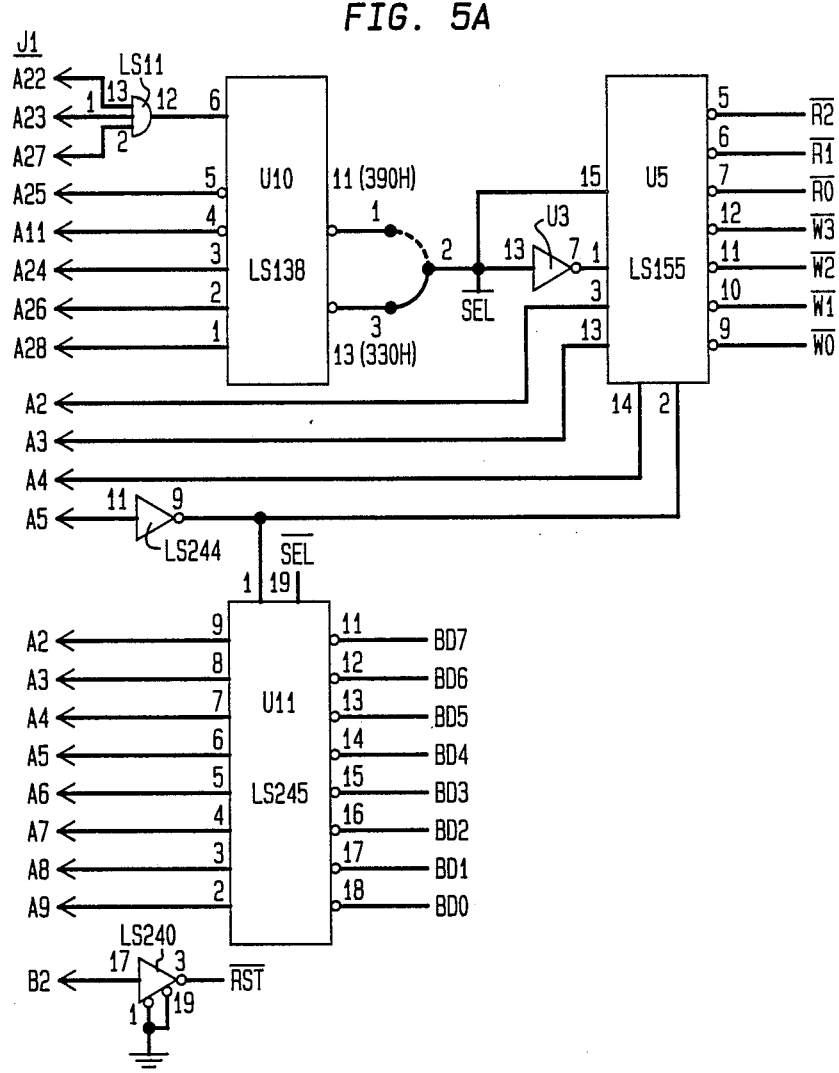
FIGS. 5A through 5C illustrate the electronics associated with scanner computer interface card.
Figure 5B:
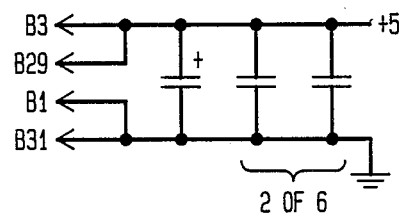
Figure 5C:
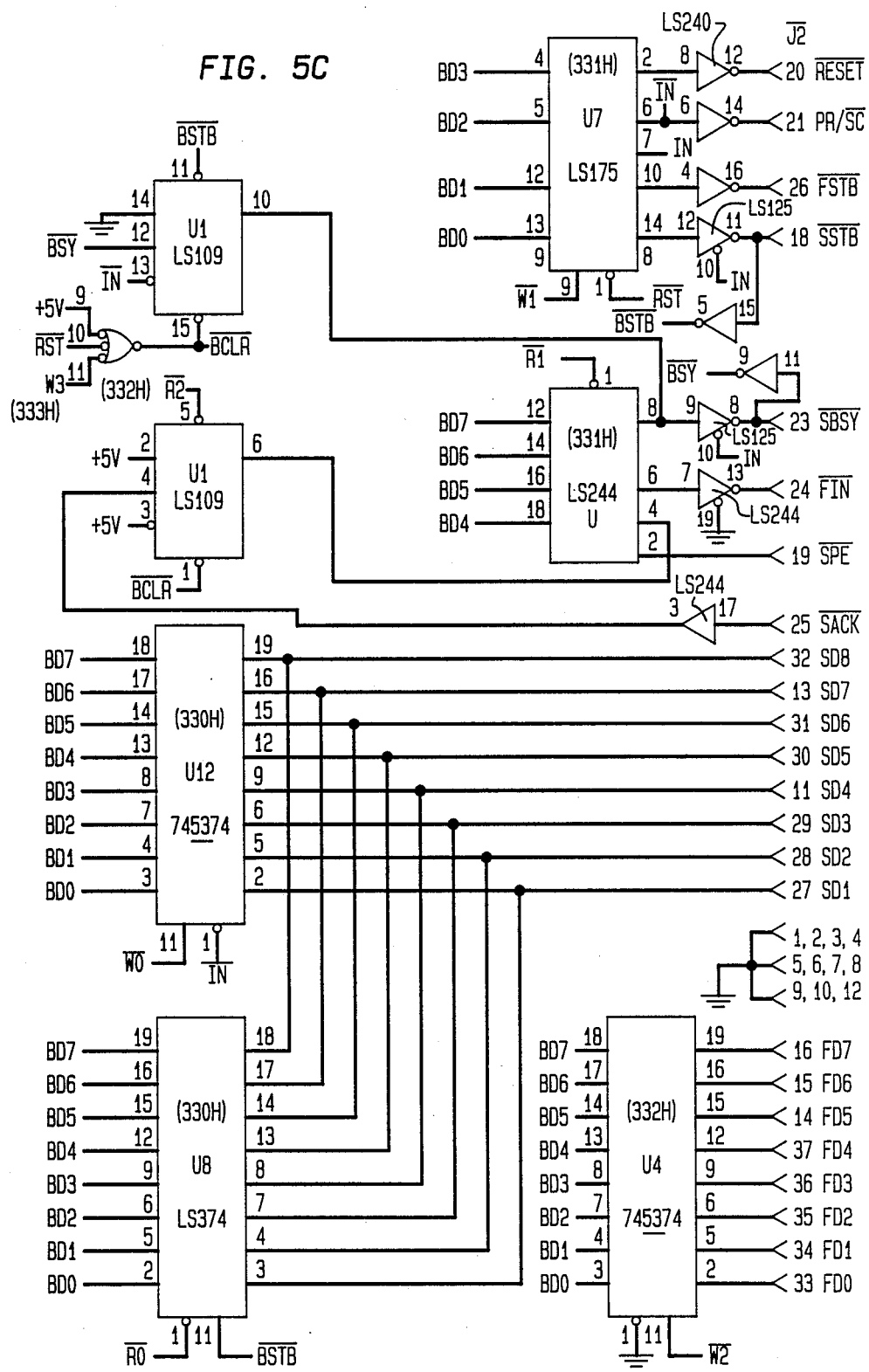
Figure 6A:
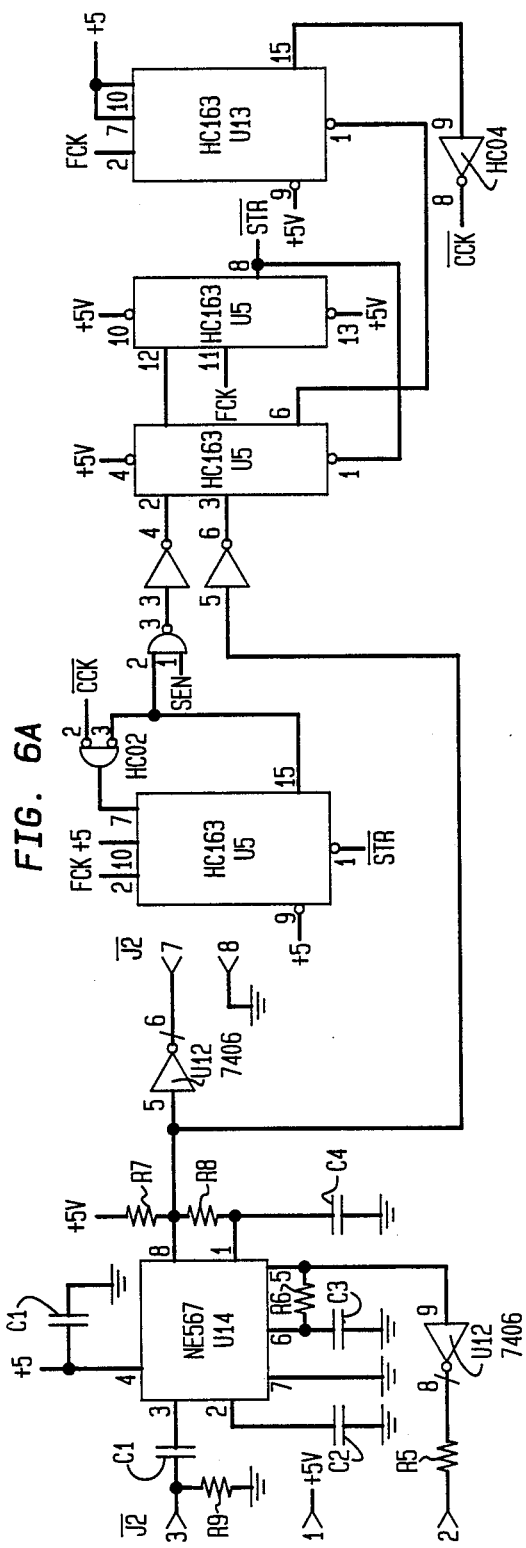
FIGS. 6A through 6E illustrate the subcircuits which comprise the electronics on the fuser controller card.
Figure 6B:
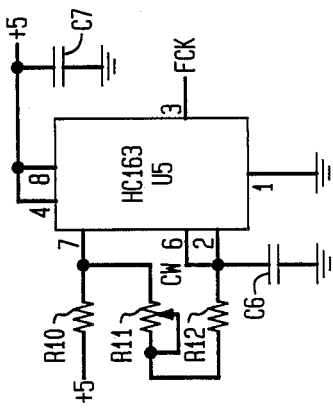
Figure 6C:
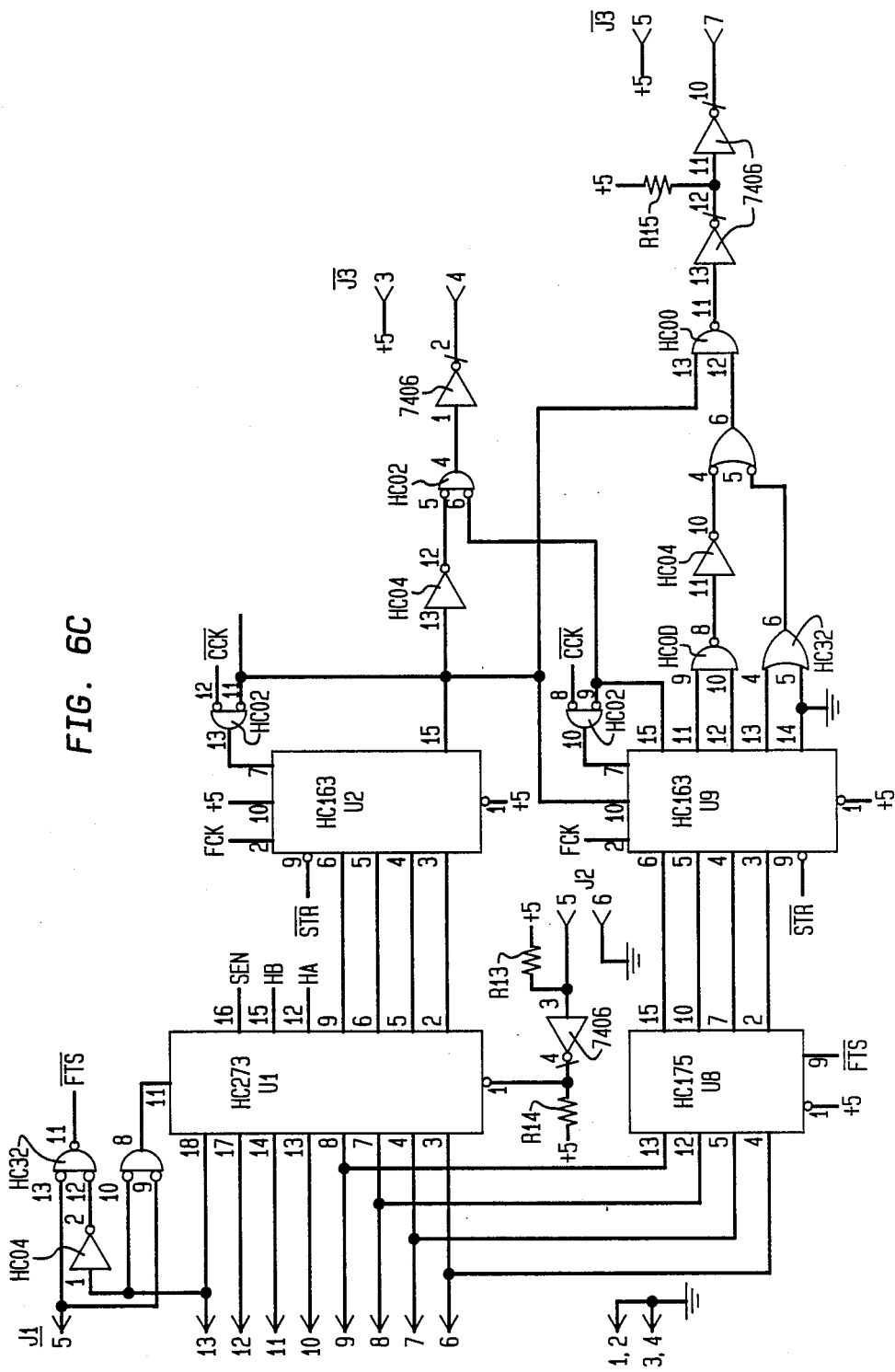
Figure 6D:
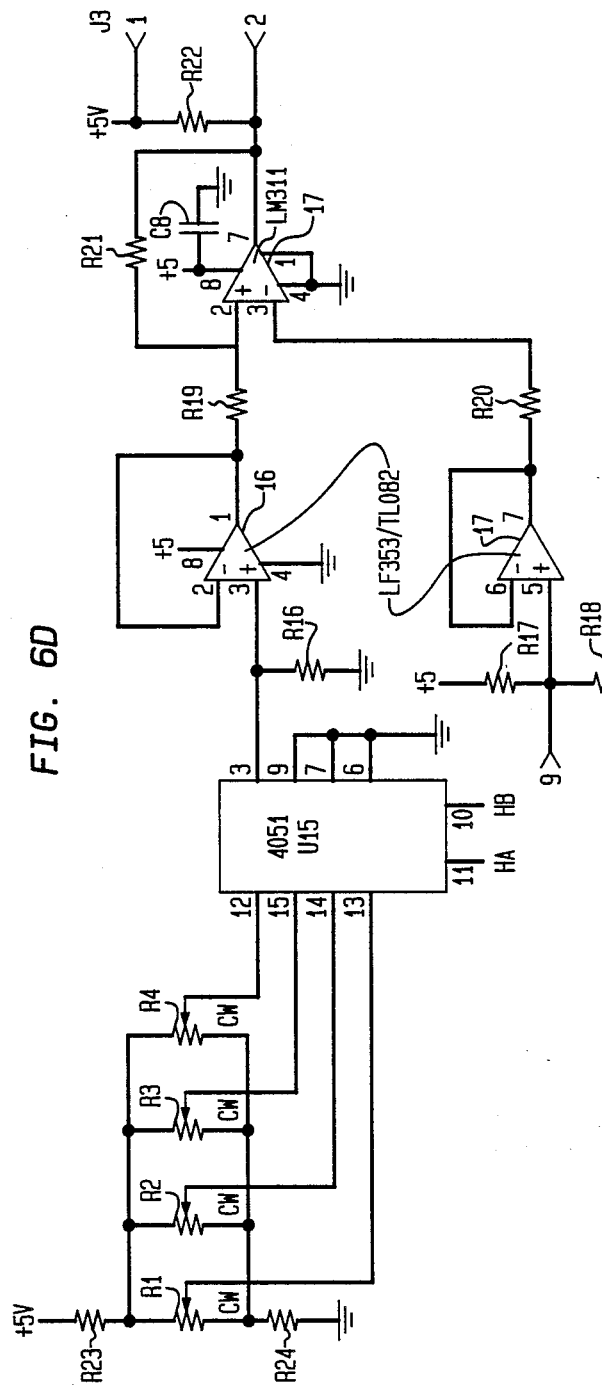
Figure 6E:
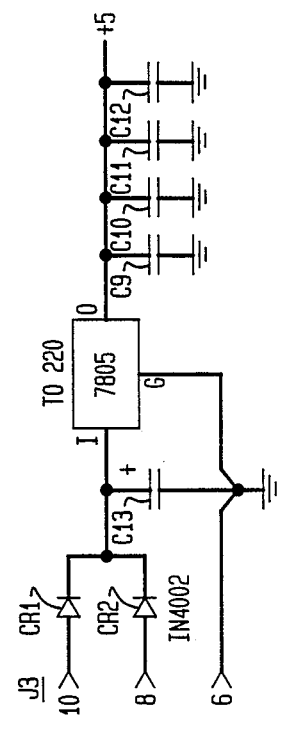
Figure 7A:
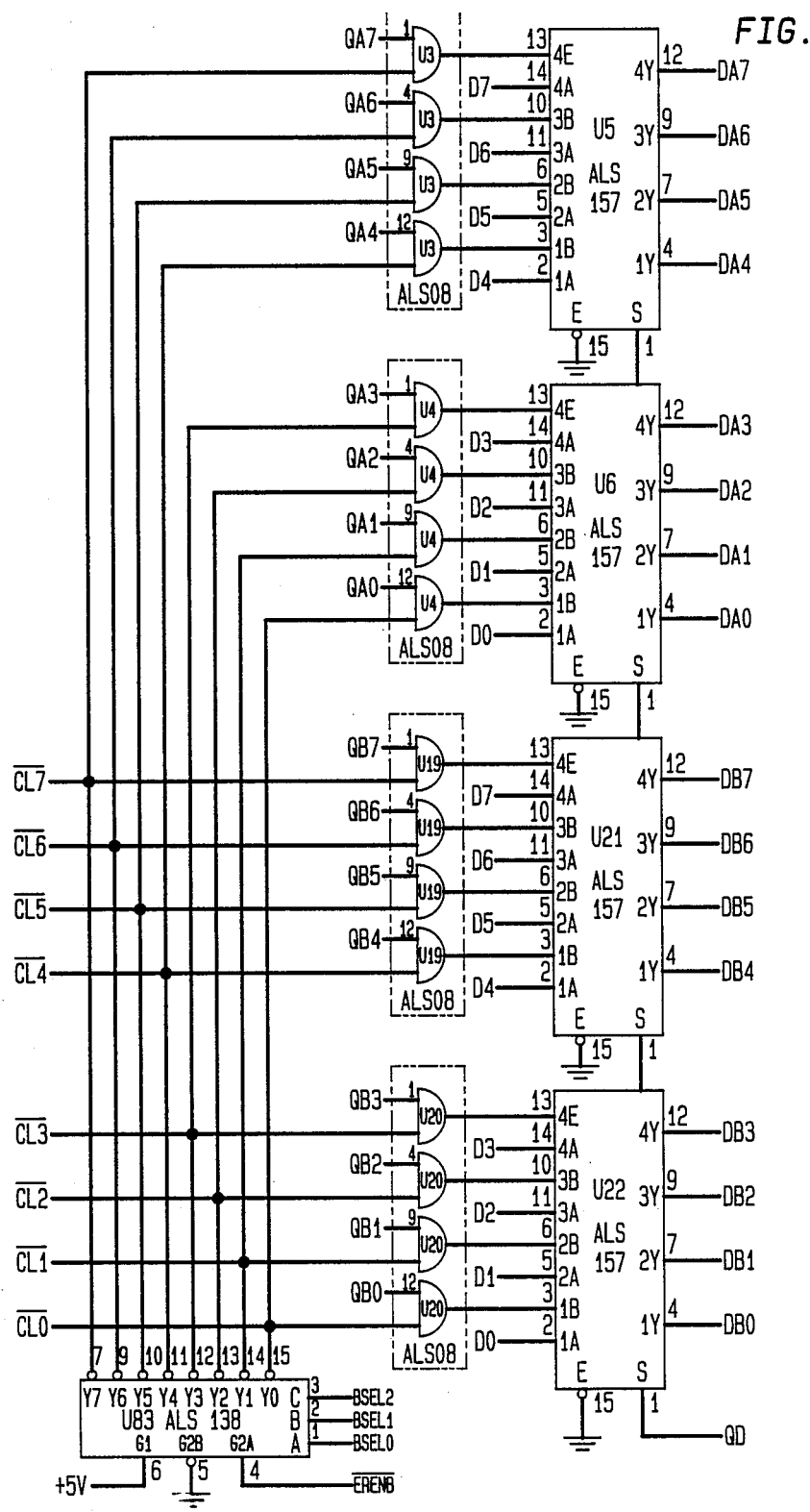
FIGS. 7A through 7F illustrate the subcircuits associated with the laser printer controller card.
Figure 7B:
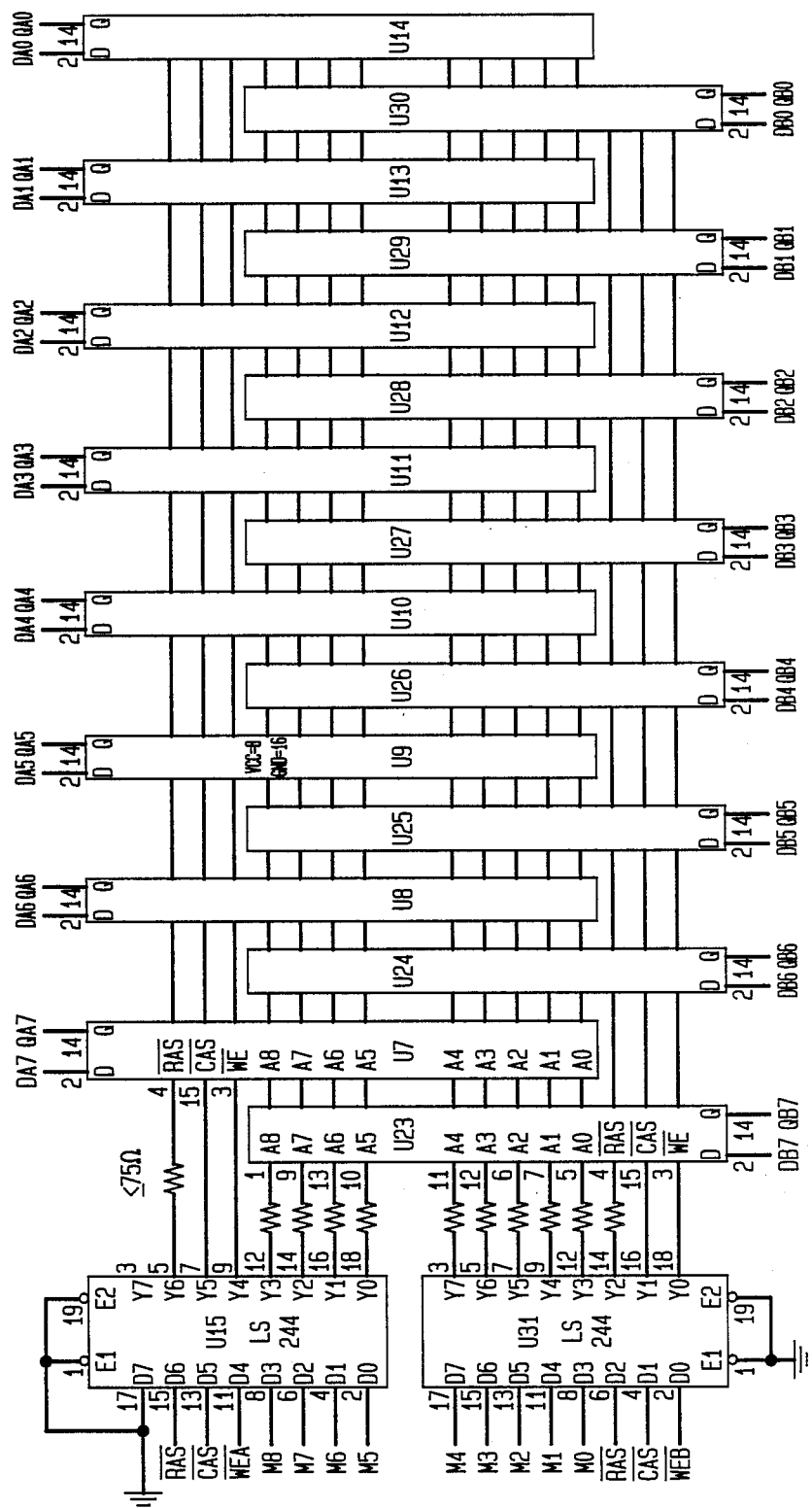
Figure 7C:
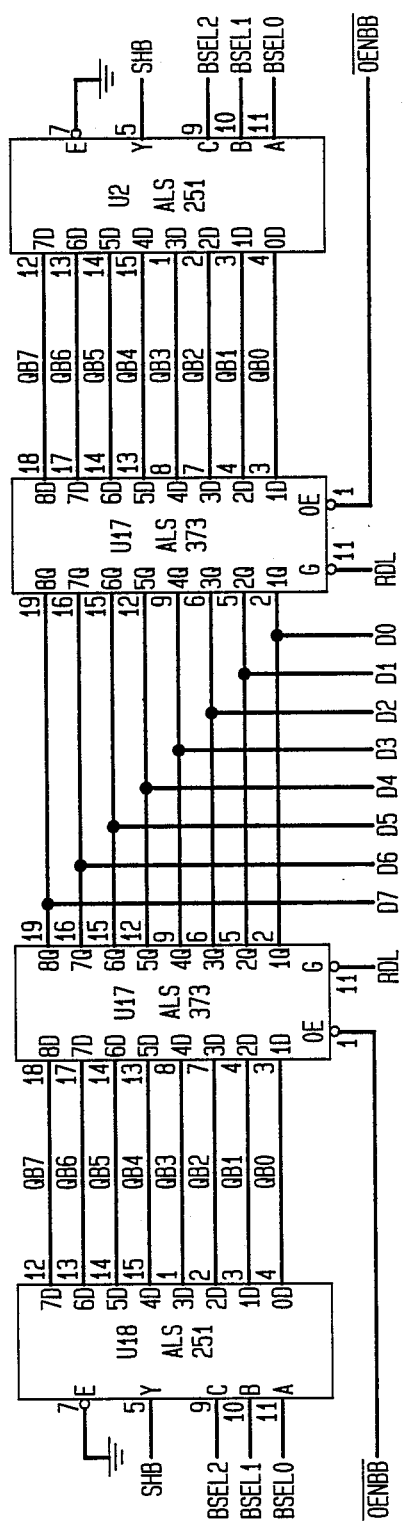
Figure 7D:
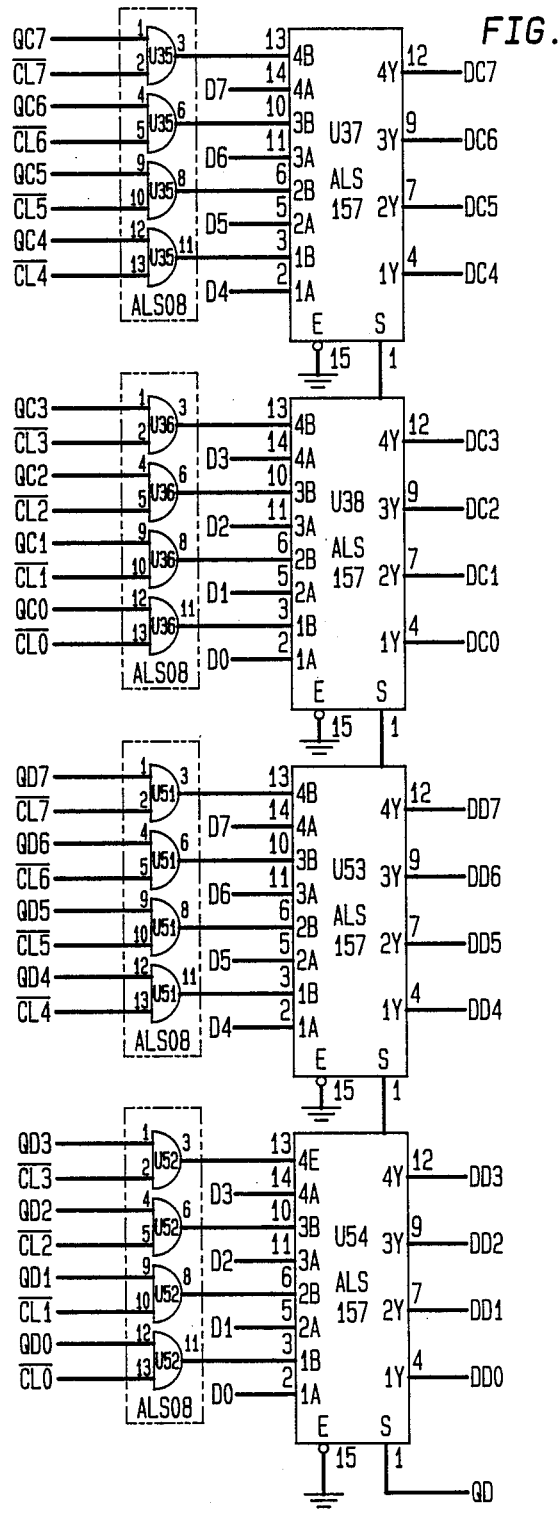
Figure 7E:
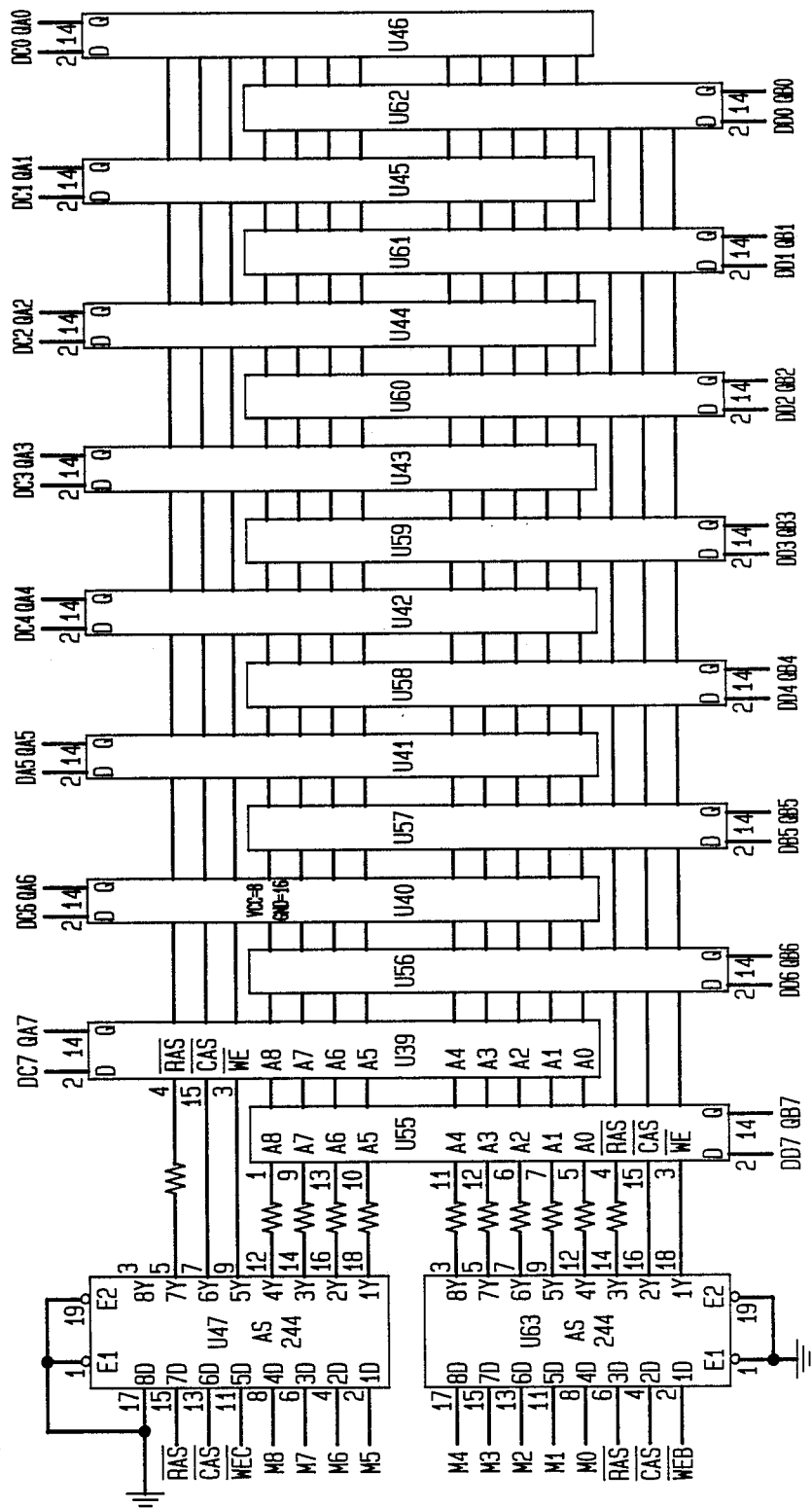
Figure 7F:
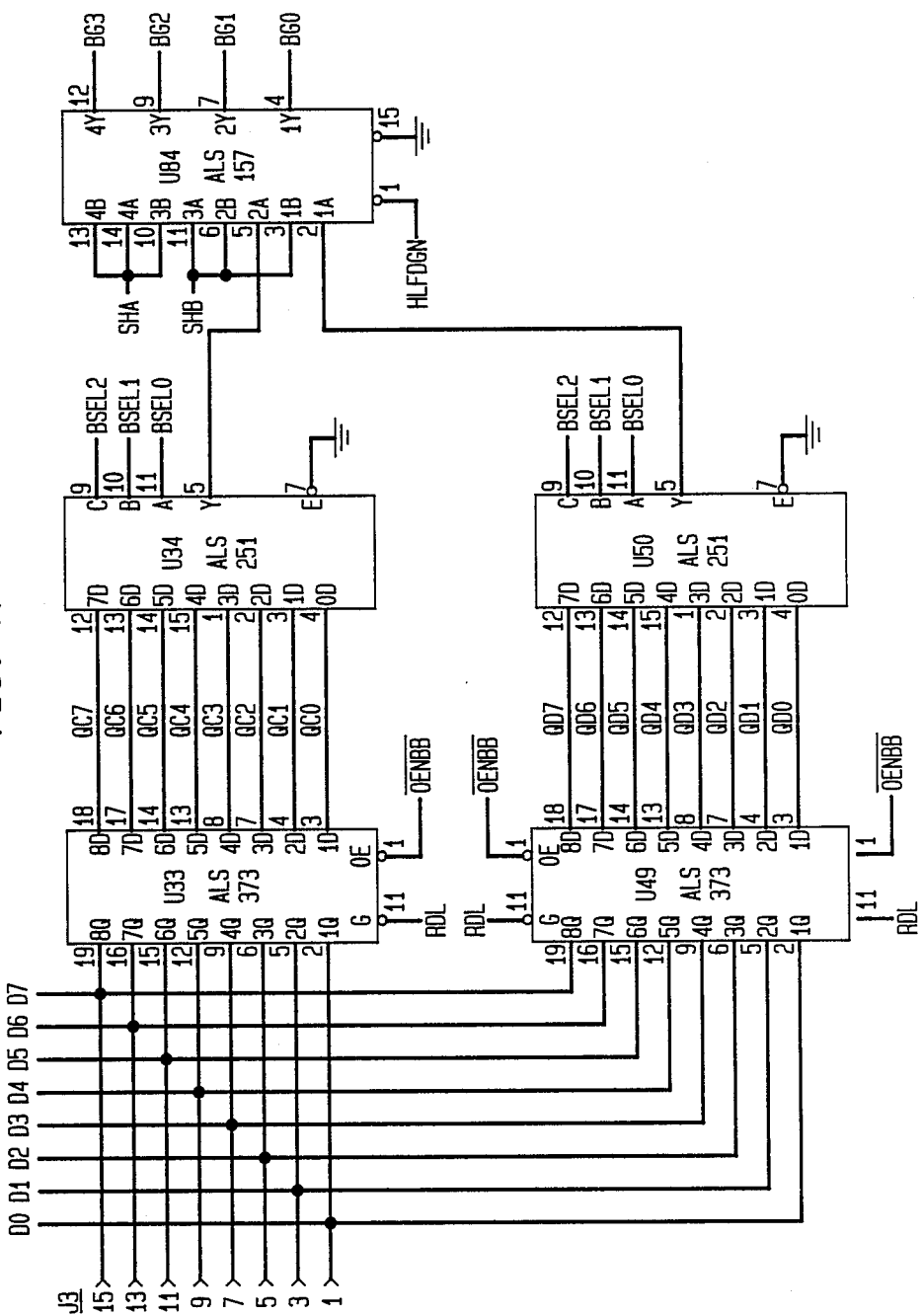
Figure 7G:
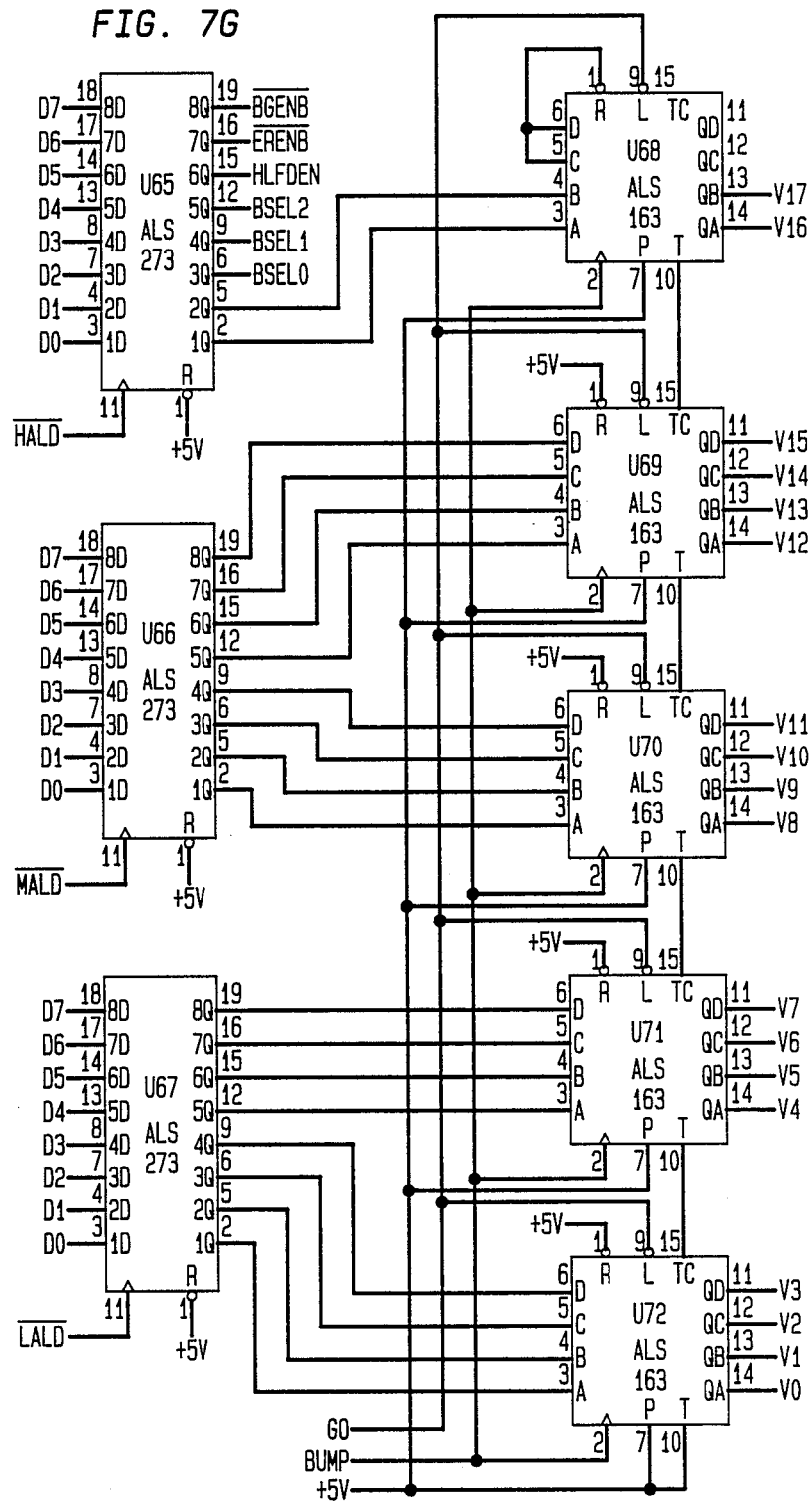
Figure 7H:
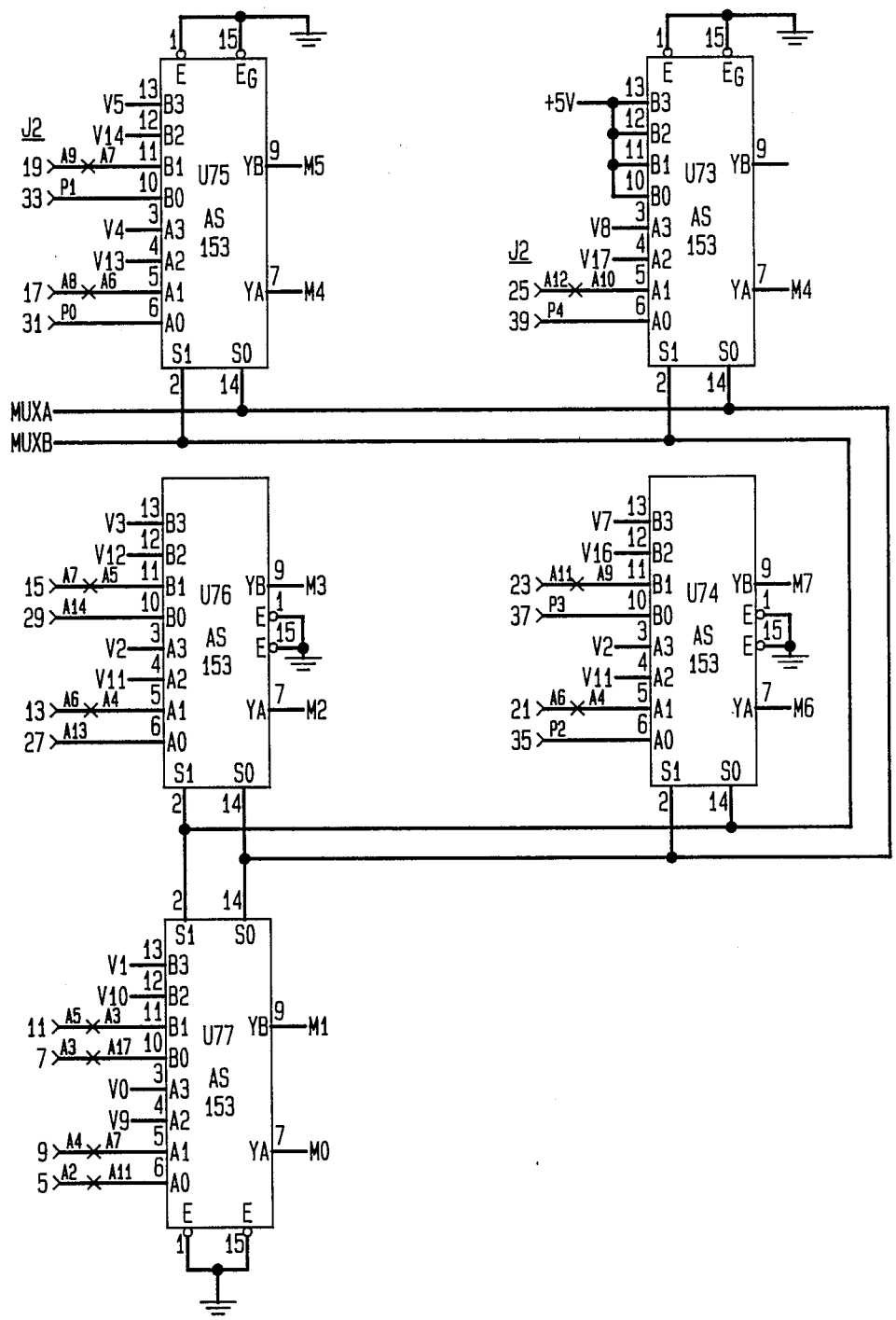
Figure 7I:
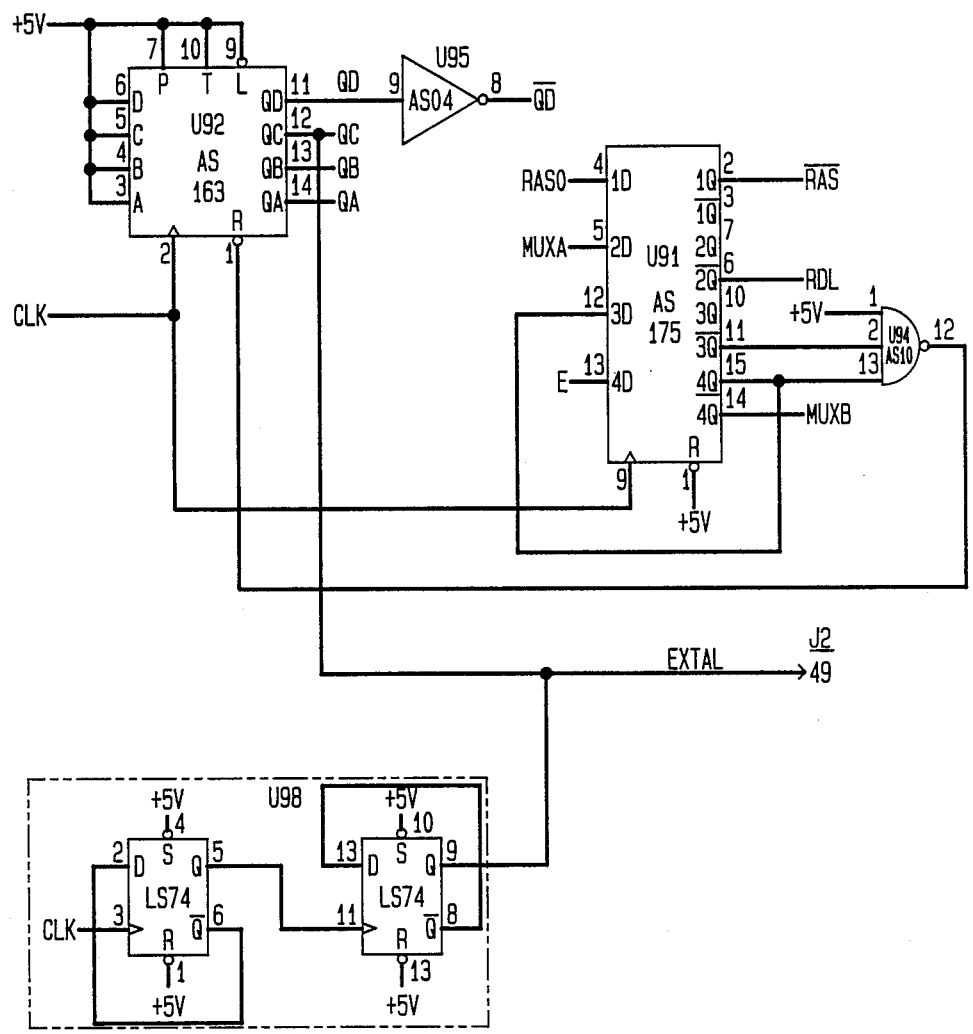
Figure 7J:
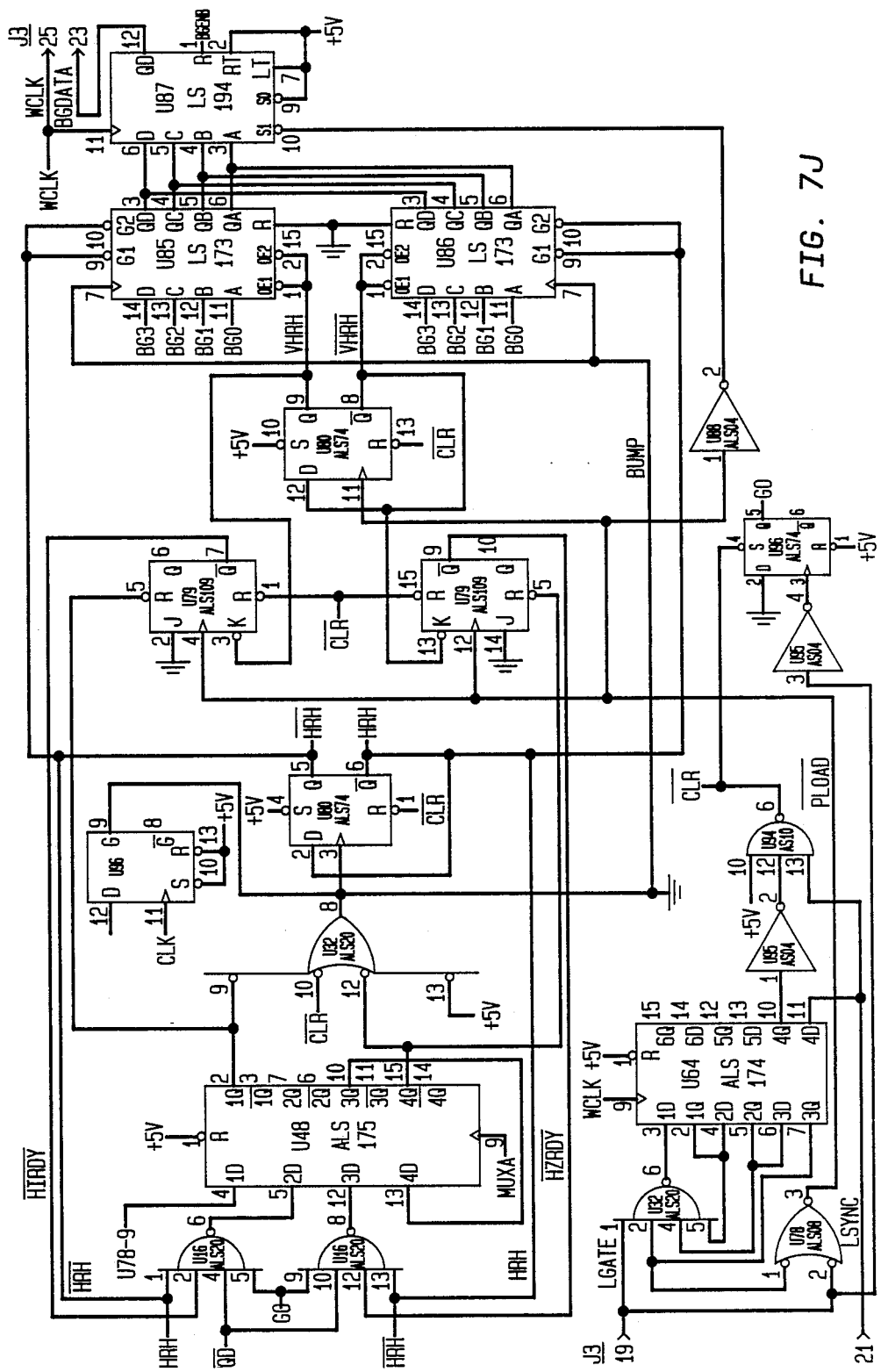
Figure 7K:
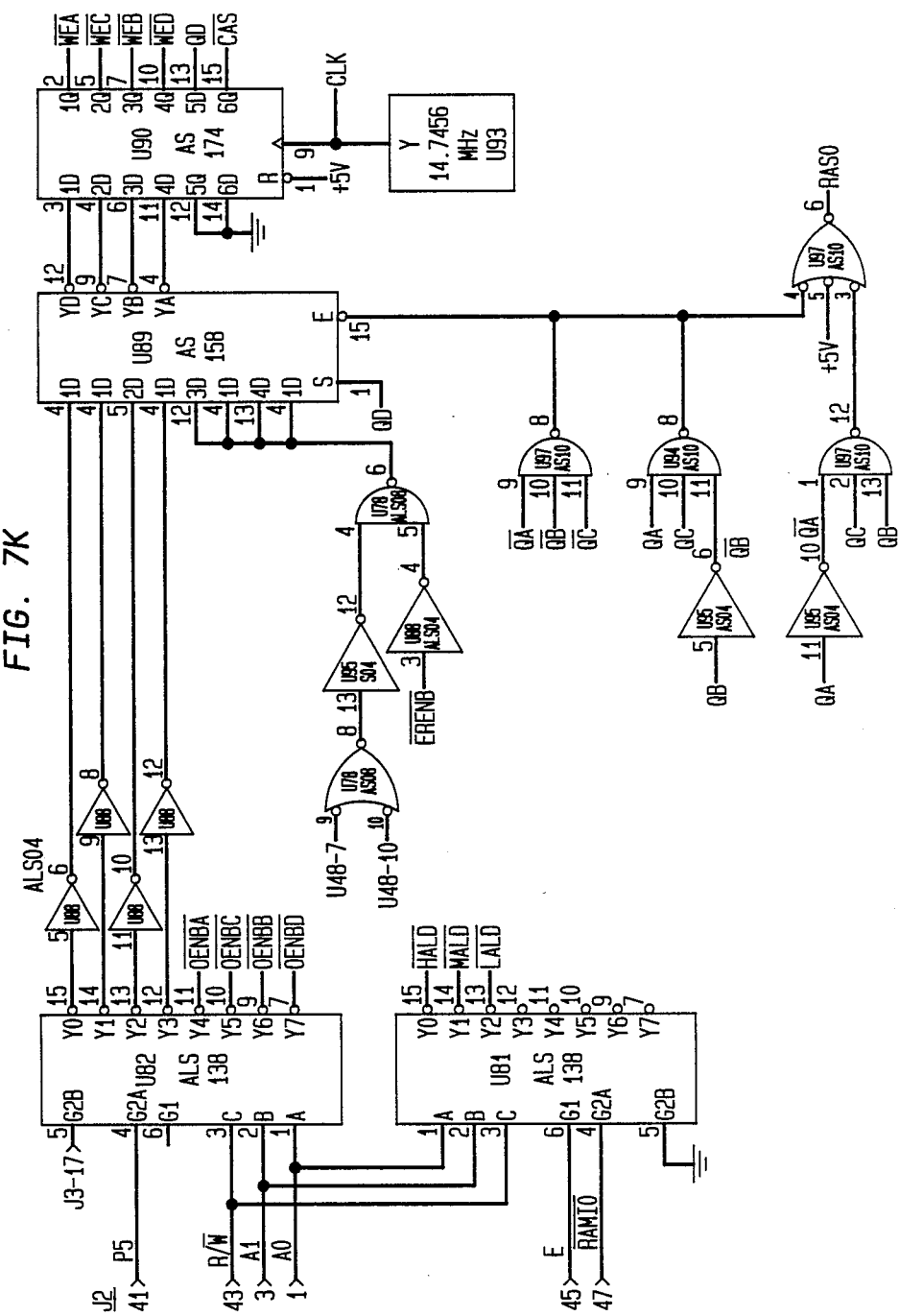
Figure 7L:
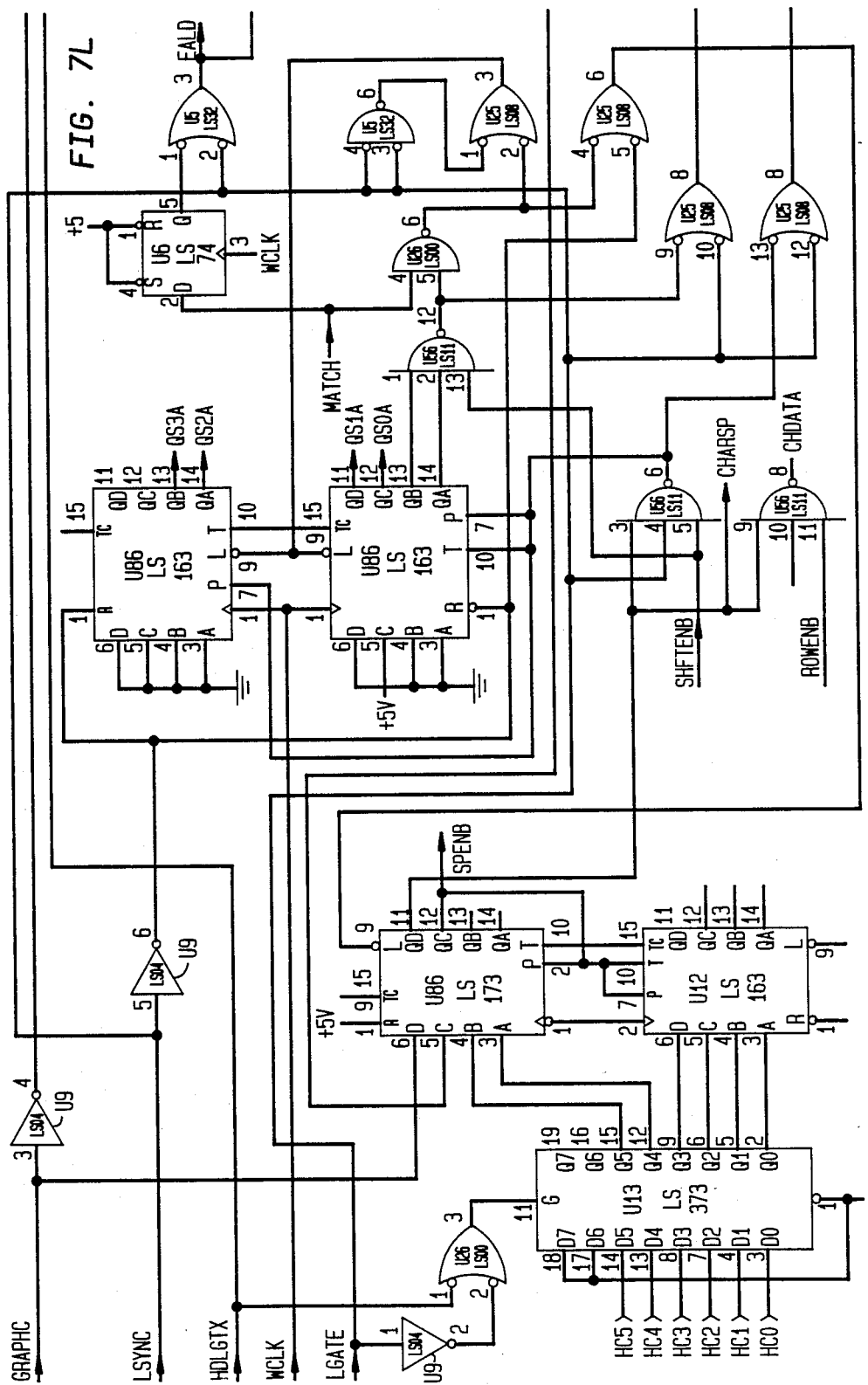
Figure 7M:
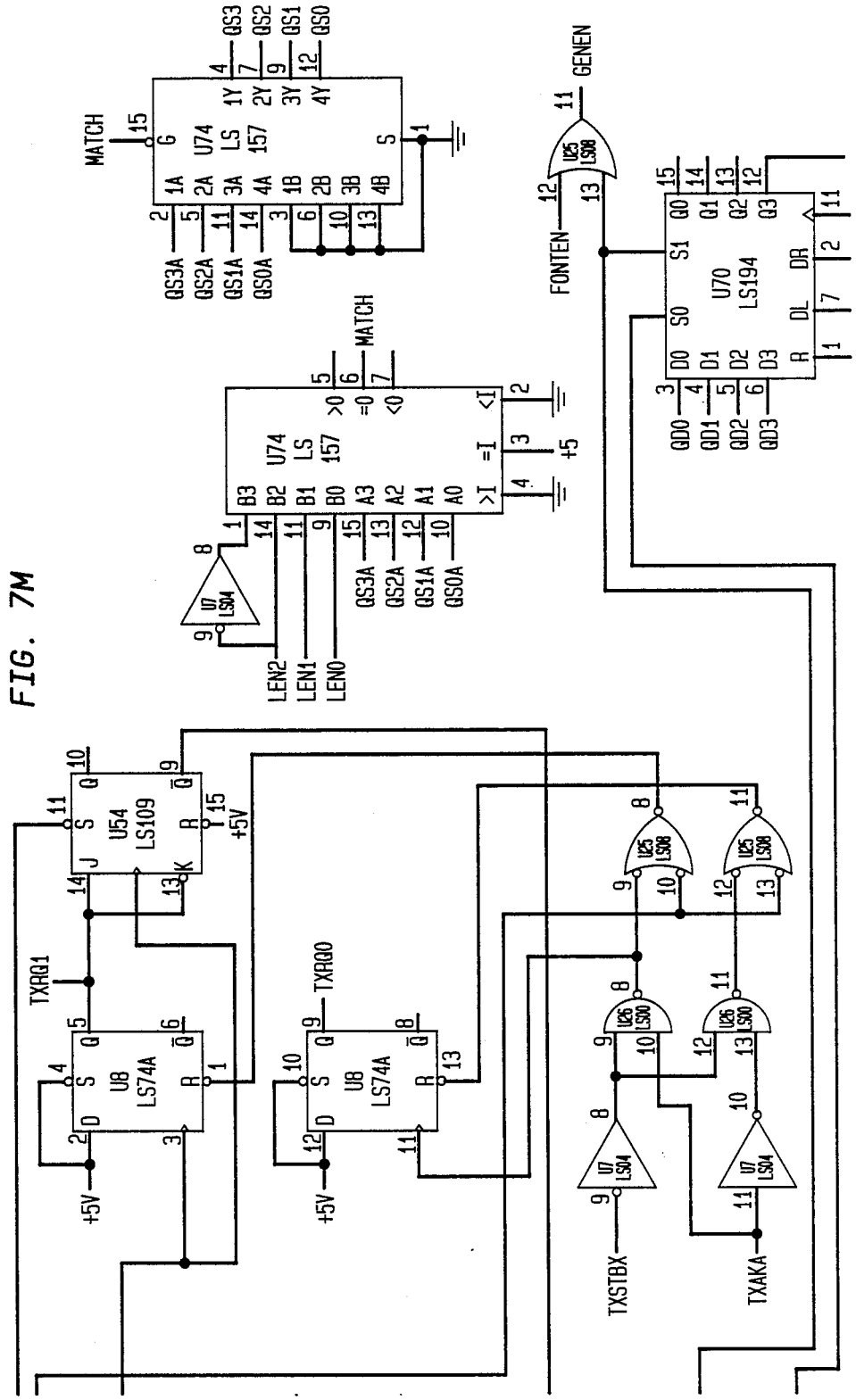
Figures 7R, 7S, 7T:
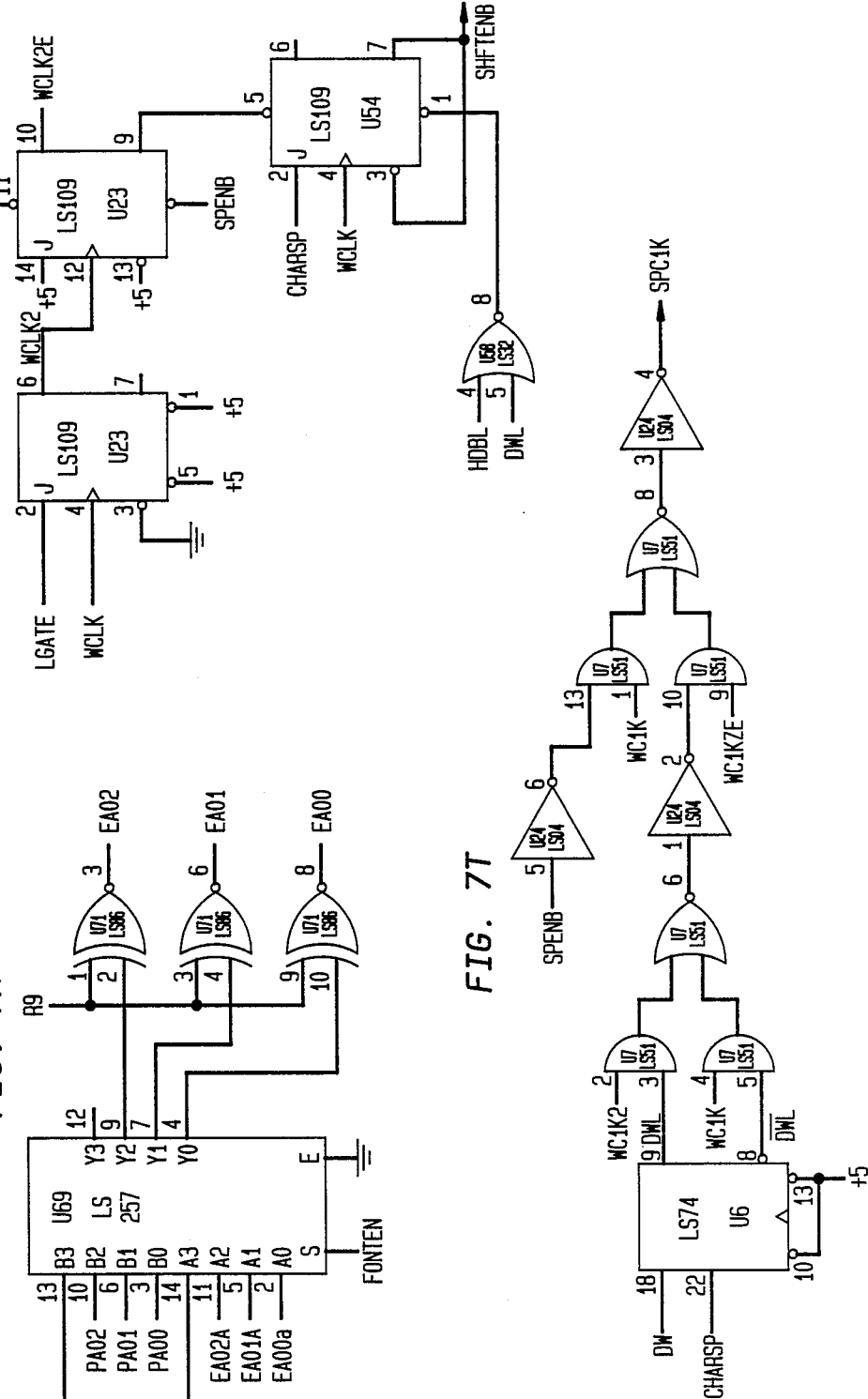
Figure 7U:
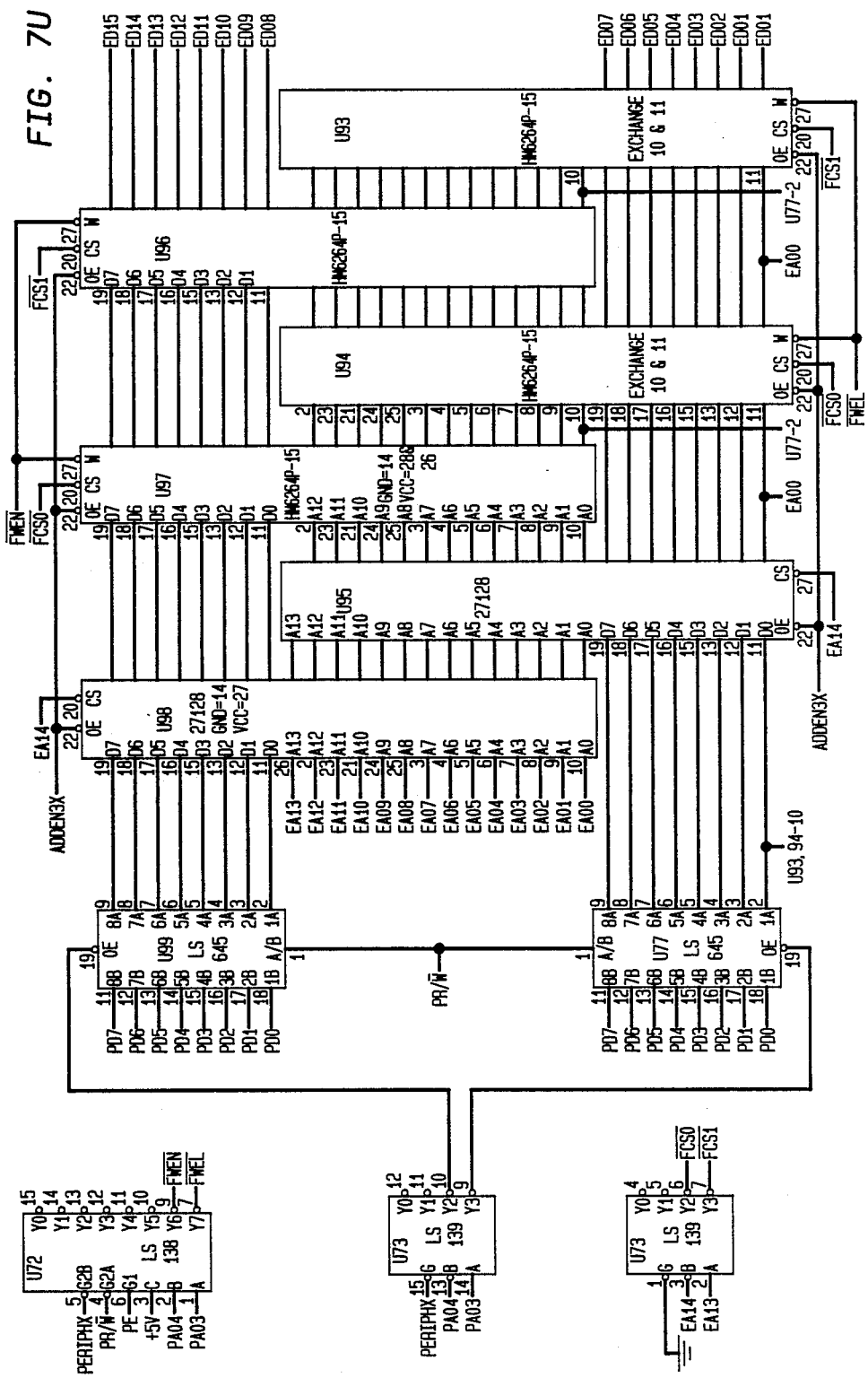
Figure 7V:
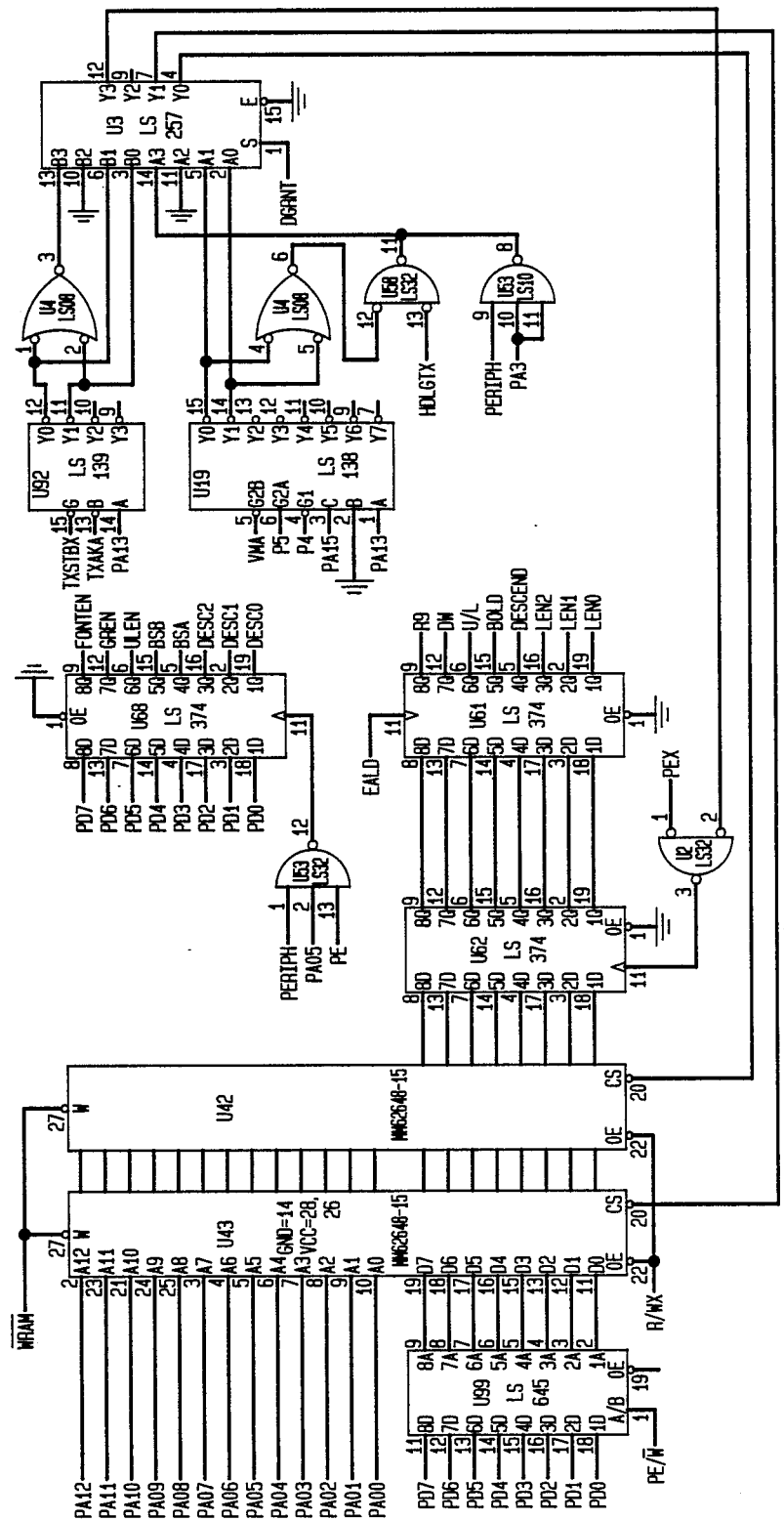
Figure 7W:
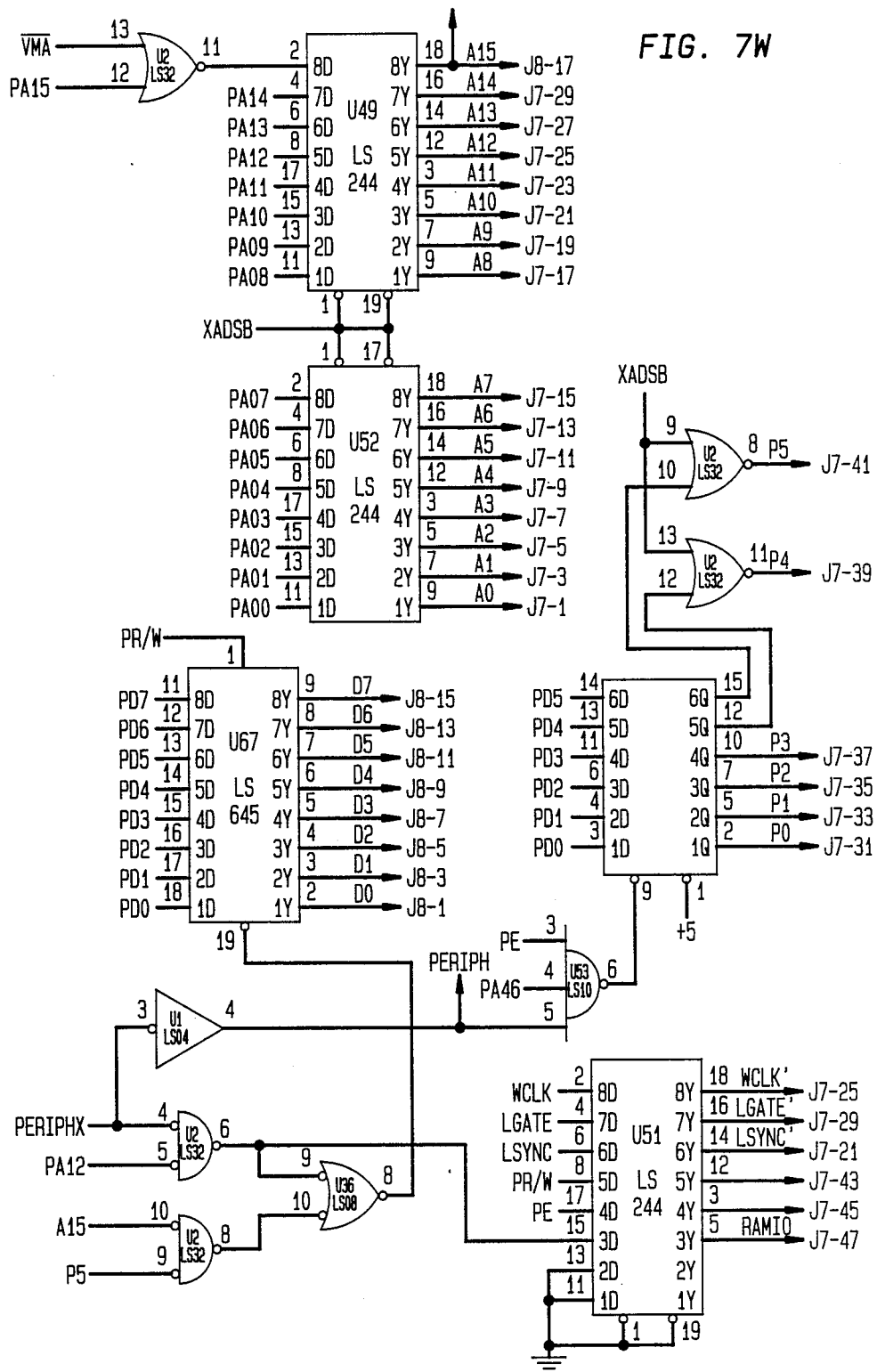
Figure 7X:
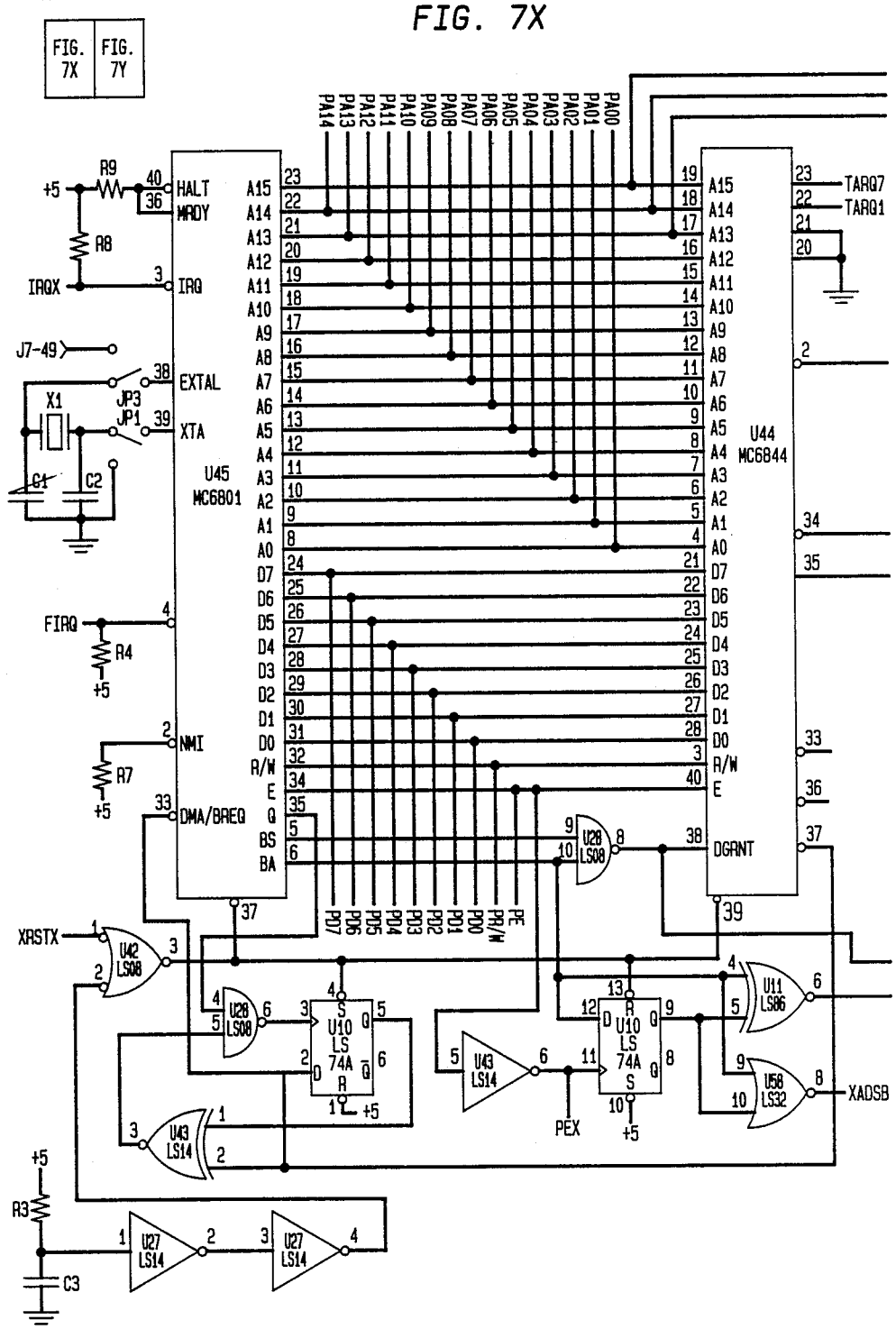
Figure 7Y:
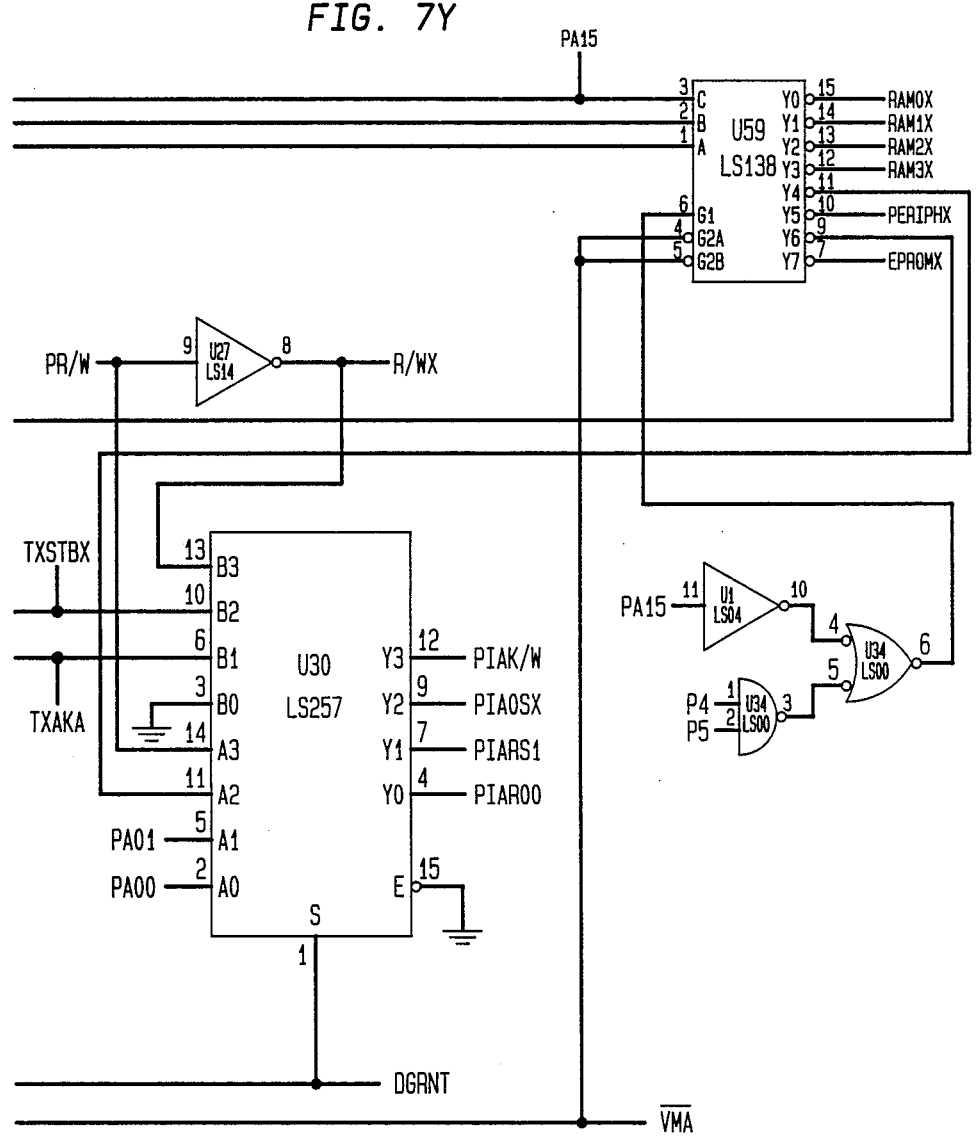
Figure 7Z:
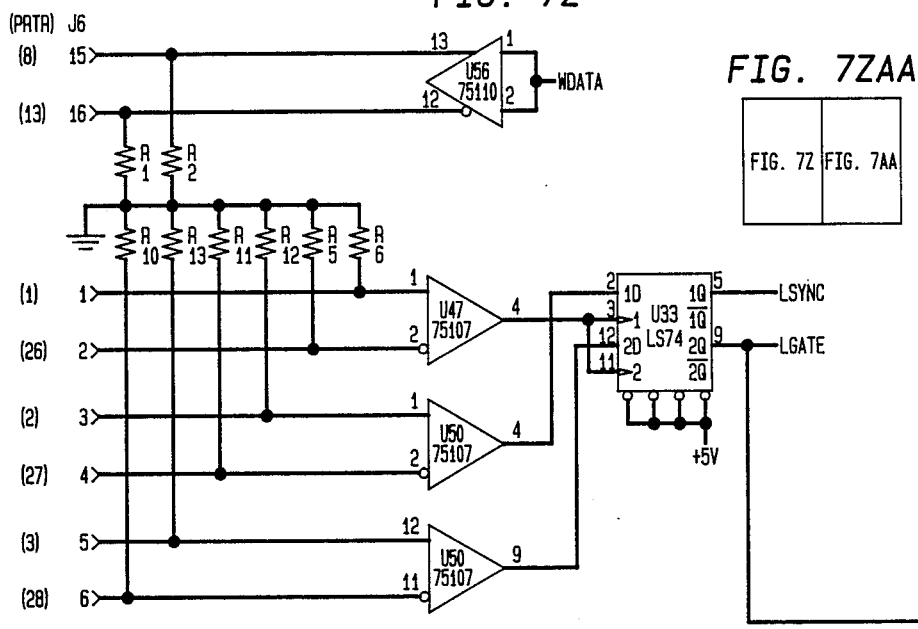
Figure 7Z:
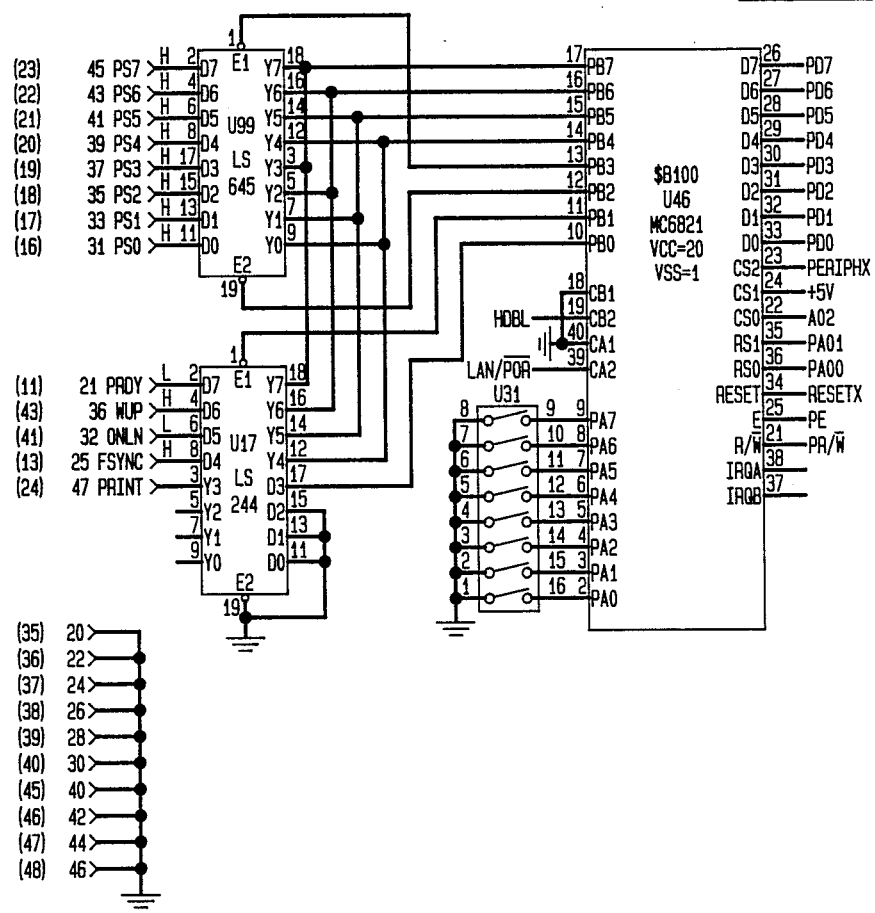
Figure 7A:
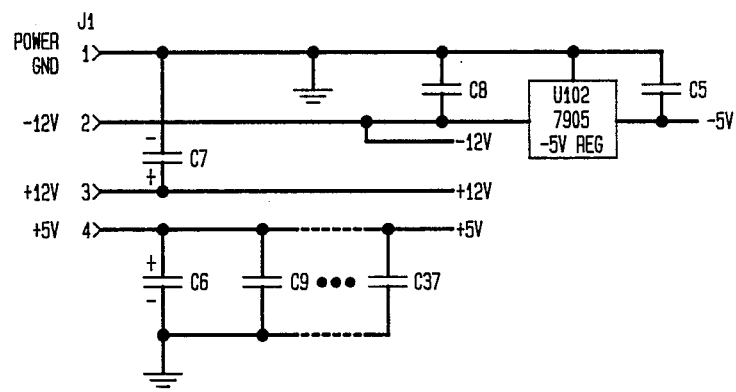
Figure 7A:
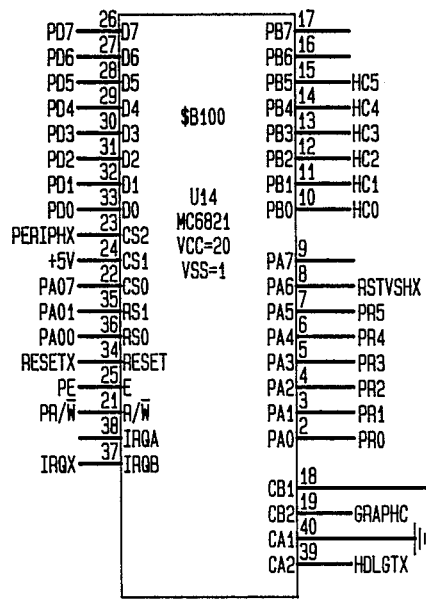
Figure 7C:
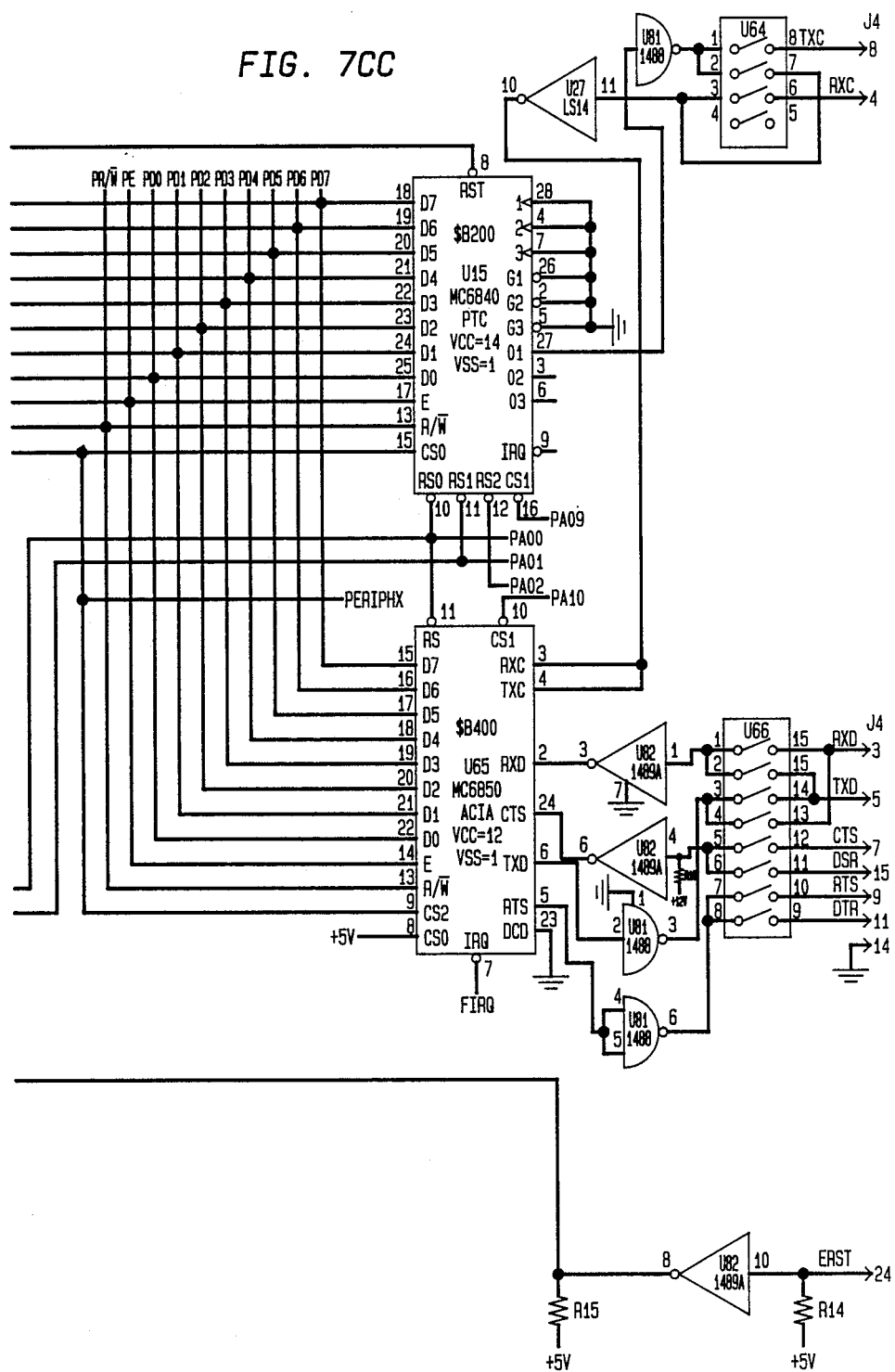
Figure 7D:
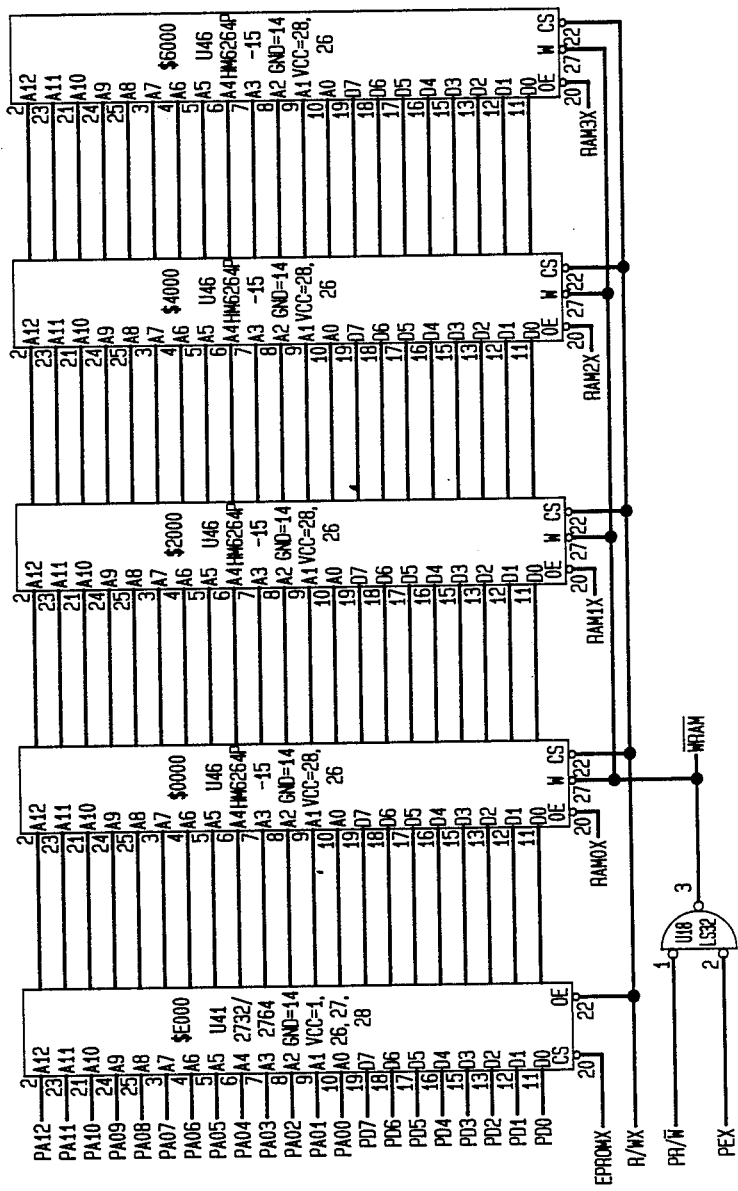
Figure 7F:
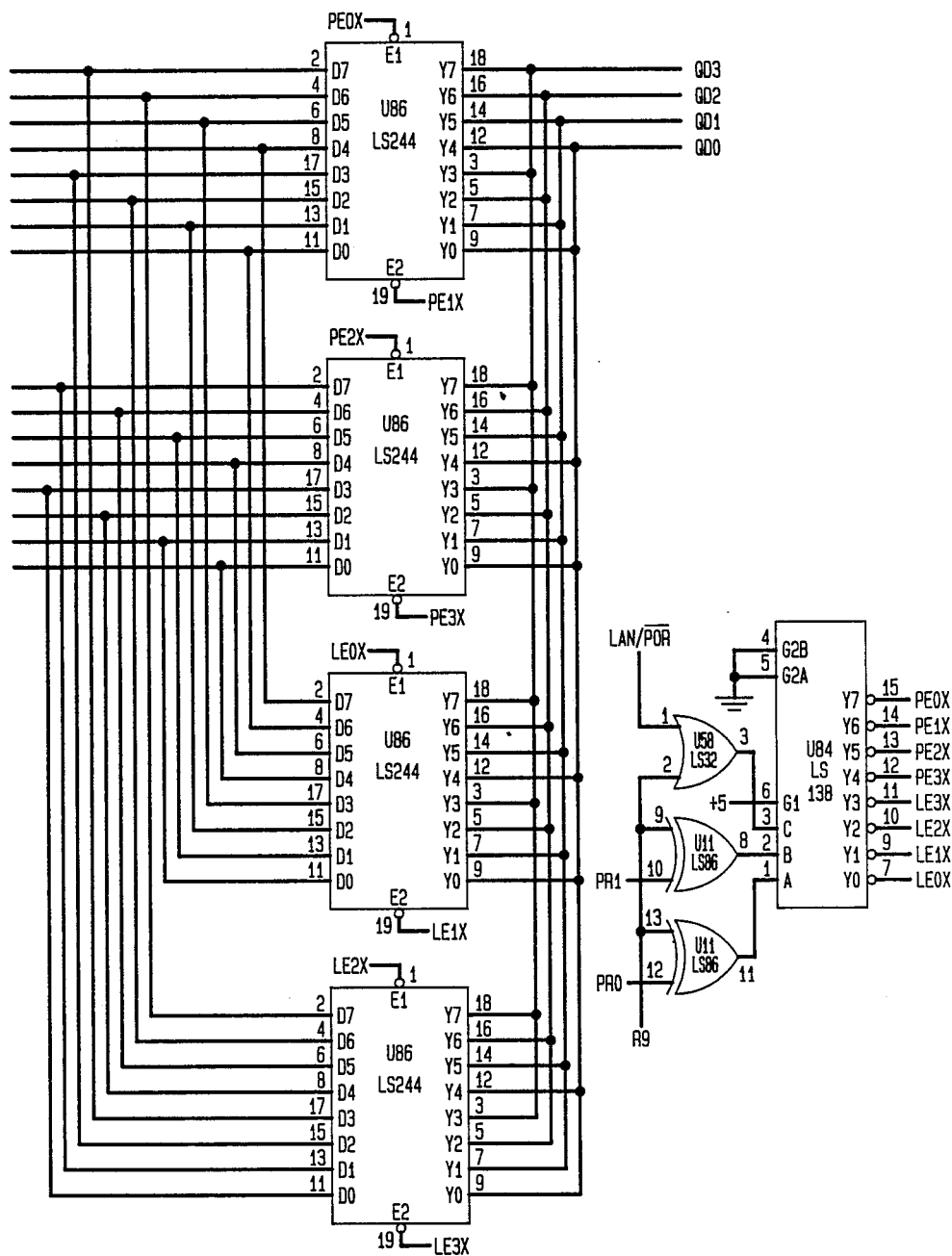

The electronic circuitry 100 associated with the invention is shown in FIG. 4. All of the electronic components shown in FIG. 4 are standard except for the color transfer unit 40 and the transfer fuser controller circuit 112. Minor modifications can be made to conventional Ricoh laser printer 38 in order for its cabinet and drive train to accept the color transfer unit 40, however, those modifications are well within the scope of one of ordinary skill in the art and are clearly described in FIGS. 2A–2E. Scanner interface board 106 and laser printer controller 110 are also slightly modified in a manner known to those of ordinary skill in the art in order to accommodate the specific computer 102, scanner 104 and printer 38 employed in the system. However, such modifications are routinely done for many systems which employ such equipment. The electronic details of the scanner interface circuit 106, controller 112 and the laser printer controller 110 transfer fuser controller 112 are shown in significant detail in FIGS. 5A–5C, 6A–6E and 7A–7X, respectively. The scanner interface 106 provides a means of connection between an IBM PC or compatible computer and a page scanner such as the Ricoh IS-30. This interface 106 also provides a port from the PC to the fuser controller circuit 112. The circuitry of the scanner interface 106 is located on a conventional board that plugs directly into the PC. The board provides a specific port for both the scanner 104 and the fuser controller circuit 112. The PC sends commands and receives status and data from the scanner 104 through the scanner interface 106 thereby allowing picture information to be transferred to the PC memory for processing. Control information to the scanner 104 is interpreted in the scanner interface 106 and converted to appropriate signals for the scanning process. Digitally scanned picture data from scanner 104 is sent to the interface 106 where it is stored 8 pixels (picture elements) at a time until the PC can't accept more data. This process continues until the desired page or part of a page is scanned by the scanner 104. Information for the fuser controller 112 is also sent through the scanner interface card 106. Fuser controller data is passed through the different port than the scanner data thereby allowing control of foil temperature, length of foil applied and the position of the foil on the resulting page. Scanner interface 106 is of the type commercially available with the exception that it is equipped with an extra port in order to be able to send information to the fuser controller 112.

The fuser controller 112 allows independent operation of the foil fusing process with the necessary parameters obtained from the PC to the scanner interface 106. Prior to fusing a printout, data indicating foil temperature, and the length and position of the applied foil 46 is sent from the scanner interface 106 to the fuser controller 112. This data is stored and is used for the subsequent sheets 88 to be printed thereby requiring no further PC intervention. The data received by the fuser controller 112 from the PC sets up conditions and parameters within the circuit which retain their status until the print run is finished. Upon completion of a print run all gates and switches are reset to an off condition. The circuitry in the fuser controller 112 detects the presence of paper using optical sensor 86 which in turn activates internal timers. The timers control the closing of the pressure roller 76 and activates the foil take up mechanism 50. The length of foil applied and when the foil is to begin is dictated by the data stored in the PC. The pressure roller 76 opens and the foil 46 is deactivated after the appropriate times have elapsed. The fuser temperature is continuously regulated using a thermo sensor and a programmable temperature control circuit. The fuser controller is self-contained consisting of a logic board, control relays and power supplies.

The laser printer controller circuit 110 connects any standard parallel port to the Ricoh laser printer engine. The printer controller 110 consists of a microprocessor 1 megabyte (minimum) of random access memory (RAM) and firmware in a programmable read only memory (PROM). A job to be printed requires information indicating quantity and format type along with the print data to be received only one and then requires no further PC intervention until completed. The printer controller 110 of the type employed in the present invention is commercially available for the Ricoh type laser printer. The present printer controller 110 of the preferred embodiment of the invention has only been slightly modified to meet the particular requirements of the system. Firmware in the printer controller 110 rotates and duplicates the print data as per the dictated format. Both the duplication on a page and the number of pages to be duplicated is performed by the printer controller microprocessor allowing the PC (the data source) to be used for other tasks during the entire printing process. The printer controller firmware also monitors the printer status indicating the need for paper, toner or other operator intervention. Upon clearing the problem the controller resumes printing any remaining copies of that form.

The major elements which comprise the electronics of the invention are set forth in the Parts List below.

Parts List - Scanner Interface 106

| Qty | Parts | Description | Designation |
|---|---|---|---|
| 13 | CAP. | .1 UFD | C1-C13 |
| 1 | CAP. | 10 UFD | C14 |
| 1 | I.C. | SN74LS109 | U1 |
| 1 | I.C. | SN74LS125 | U6 |
| 1 | I.C. | SN74LS138 | U10 |
| 1 | I.C. | SN74LS155 | U5 |
| 1 | I.C. | SN74LS175 | U7 |
| 1 | I.C. | SN74LS11 | U9 |
| 1 | I.C. | SN74LS240 | U3 |
| 1 | I.C. | SN74LS244 | U2 |
| 1 | I.C. | SN74LS245 | U11 |
| 3 | I.C | SN74LS374 | U4 U8 U12 |
| 1 | CONN | 36 D-CONN | J2 |
| 1 | BOARD | P.C. BOARD | |

Parts List - Laser Printer Controller 110

| Qty | Parts | Description | Designation |
|---|---|---|---|
| 1 | BOARD | P.C. BOARD | C1-C25, C27-C30 |
| 94 | CAP. | .1 UFD | C1-C25, C27-C30 |
| | CAP. | .1 UFD | C33-C96, C99 |
| 4 | CAP. | 100 UFD | C26-C97, C98, C100 |
| 2 | CAP. | 24 PF | C31-C32 |
| 1 | CAP. | 470 PF | C101 |
| 1 | I.C. | 1488 | U81 |
| 1 | I.C. | 1489 A | U82 |
| 1 | I.C. | 2784 | U41 |
| 2 | I.C. | 27128 | U95-U98 |
| 2 | I.C. | 75107 | U47-U50 |
| 1 | I.C. | 75110 | U16 |
| 1 | I.C. | 7905 | U102 |
| 10 | I.C. | HM6264P-15 | U37-U38-U39-U40-U42 |
| | I.C. | HM6264P-15 | U43-U99-U94-U96-U97 |
| 1 | I.C. | MC6809 | U45 |
| 4 | I.C. | MC6821 | U14-U46-U90-U100 |
| 1 | I.C. | MC6840 | U15 |
| 1 | I.C. | MC6844 | U44 |
| 1 | I.C. | MC6850 | U65 |
| 3 | I.C. | SN74LS00 | U28-U34-U79 |
| 3 | I.C. | SN74LS04 | U1-U9-U24 |
| 5 | I.C. | SN74LS08 | U4-U21-U25-U28-U36 |
| 1 | I.C. | SN74LS10 | U53 |
| 2 | I.C. | SN74LS109 | U23-U54 |
| 1 | I.C. | SN74LS11 | U56 |
| 4 | I.C. | SN74LS138 | U19-U59-U72-U84 |
| 2 | I.C. | SN74LS139 | U73-U92 |
| 1 | I.C. | SN74LS14 | U27 |
| 1 | I.C. | SN74LS157 | U74 |
| 4 | I.C. | SN74LS169 | U12-U29-U55-U57 |
| 1 | I.C. | SN74LS174 | U48 |
| 1 | I.C. | SN74LS175 | U20 |
| 1 | I.C. | SN74LS194 | U70 |
| 10 | I.C. | SN74LS244 | U17-U32-U49-U51-U52 |
| | I.C. | SN74LS244 | U67-U85-U86-U87-U88 |
| | I.C. | SN74LS244 | U104 |
| 5 | I.C. | SN74LS257 | U3-U30-U69-U75-U78 |
| 1 | I.C. | SN74LS283 | U80 |
| 1 | I.C. | SN74LS30 | U35 |
| 5 | I.C. | SN74LS32 | U2-U5-U18-U22-U58 |
| 2 | I.C. | SN74LS373 | U13-U83 |
| 5 | I.C. | SN74LS374 | U61-U62-U68-U89-U91 |
| 1 | I.C. | SN74LS51 | U7 |
| 4 | I.C. | SN74LS845 | U63-U67-U77-U99 |
| 4 | I.C. | SN74LS74 A | U6-U8-U10-U33 |
| 2 | I.C. | SN74LS85 | U60-U78 |
| 2 | I.C. | SN74LS88 | U11-U71 |
| 1 | R.Net | 4.7K | U101 |
| 1 | RES. | 100 OHM .5% ¼ W | R21 |
| 5 | RES. | 10K 5% ¼ W | R3-R14-R15-R16-R20 |
| 6 | RES. | 2.7K 5% ¼ W | R4-R7-R8-R9-R17 |
| 32 | CAP. | .01 UFD | C1-C32 |
| 33 | CAP. | .1 UFD | C33-C65 |
| 32 | I.C. | HM50256-15 | U7-U14-U29-U30 |
| | I.C. | HM50256-15 | U39-U46-U55-U62 |
| 1 | I.C. | SN74LS04 | U88 |
| 9 | I.C. | SN74LS08 | U3-U4-U19-U20-U35 |
| | I.C. | SN74LS08 | U36-U51-U52-U78 |
| 1 | I.C. | SN745LS109 | U79 |
| 3 | I.C. | SN74LS138 | U81-U82-U83 |
| 9 | I.C. | SN74LS157 | U5-U6-U21-U22-U37 |
| | I.C. | SN74LS157 | U38-U53-U54-U84 |
| 5 | I.C. | SN74LS163 | U68-U69-U70-U71-U72 |
| 2 | I.C. | SN74LS179 | U85-U86 |
| 1 | I.C. | SN74LS174 | U64 |
| 1 | I.C. | SN74LS175 | U48 |
| 1 | I.C. | SN74LS194 | U87 |
| 2 | I.C. | SN74LS20 | U16-U32 |
| 4 | I.C. | SN74LS251 | U2-U18-U34-U50 |
| 3 | I.C. | SN74LS273 | U65-U66-U67 |
| 4 | I.C. | SN74LS373 | U1-U17-U33-U49 |
| 3 | I.C. | SN74LS74 | U80-U96-U98 |
| 1 | I.C. | SN74S04 | U95 |
| 2 | I.C. | SN74S10 | U94-U97 |
| 5 | I.C. | SN74S153 | U73-U74-U75-U67-U77 |
| 1 | I.C. | SN74S158 | U89 |
| 1 | I.C. | SN74S163 | U92 |
| 1 | I.C. | SN74S174 | U90 |
| 1 | I.C. | SN74S175 | U91 |
| 4 | I.C. | SN74S244 | U15-U31-U47-U63 |
| 1 | OSC. | 14.5476 MHZ | U93 |
| 1 | CONN | 50 PINS | J2 |
| 1 | CONN | 26 PINS | J3 |
| 1 | CONN | 4 PINS POWER | J1 |
| 1 | BOARD | P.C. BOARD | |
| | RES. | 2.7K 5% ¼ W | R19 |
| 2 | RES. | 4.7K 5% ¼ W | R1-R2 |
| 6 | RES. | 56 OHM 5% ¼ W | R5-R6-R10-R11-R12 |
| | RES. | 56 OHM 5% ¼ W | R13 |
| 1 | RES. | 82 OHM 5% ¼ W | R18 |
| 2 | SW | DIP | U31-U66 |
| 1 | TRAN. | 2N2222 | Q1 |
| 1 | XTAL | 3.6864 MHZ. | X1 |

Parts List - Fuser Controller and Timer 112

| Qty | Parts | Description | Designation |
|---|---|---|---|
| 1 | BOARD | P.C. BOARD | |
| 11 | CAP. | .1 UFD | C1-C5-C-7-C8-C11 |
| | CAP. | .1 UFD | C13-C14-C15 |
| 3 | CAP. | .015 UFD | C6-C14-C15 |
| 1 | CAP. | 1000 UFD 16 V | C12 |
| 1 | I.C. | 4051 | U15 |
| 1 | I.C. | 7805 | U18 |
| 1 | I.C. | LF353/TL082 | U16 |
| 1 | I.C. | LM311 | U17 |
| 1 | I.C. | NE555 | U7 |
| 1 | I.C. | NE587 | U14 |
| 1 | I.C. | SN7406 | U12 |
| 1 | I.C. | SN74HC00 | U10 |
| 1 | I.C. | SN74HC02 | U3 |

-continued

| | | | |
|---|---|---|---|
| 1 | I.C. | SN74HC04 | U11 |
| 4 | I.C. | SN74HC163 | U2-U5-U9-U13 |
| 1 | I.C. | SN74HC175 | U8 |
| 1 | I.C. | SN74HC273 | U1 |
| 1 | I.C. | SN74HC32 | U4 |
| 1 | I.C. | SN74HC74 | U8 |
| 4 | POT. | 10K 15 TURNS | R1-R4 |
| 1 | POT. | 100K 15 TURNS | R11 |
| 1 | RES. | 100 OHMS 5% ¼ W | R12 |
| 1 | RES. | 750 OHM 5% ¼ W | R16-R17 |
| 1 | RES. | 1K 5% ¼ W | R9 |
| 1 | RES. | 3-9K 5% ¼ W | R7 |
| 1 | RES. | 8-2K 5% ¼ W | R10 |
| 7 | RES. | 10K 5% ¼ W | R5-R13-15-R20-R22-R24 |
| 2 | RES. | 150K 5% ¼ W | R8-R6 |
| 1 | RES. | 510K 5% ¼ W | R23 |
| 1 | RES. | 680K 5% ¼ W | R21 |
| 1 | CONN. | 14 PINS SOCKET | J1 |
| 1 | CONN. | DB15P | J2 |

The software that drives computer 102 is dividable into four subprograms as follows:
1. Set up
2. Text
3. Edit
4. Print
5. Auto format An understanding of the details of the software is not necessary for an understanding of the invention as a whole. The purpose of the set up program is to determine initial parameters for the process including number of colors, temperature of foils, etc. The text program is a standard type program for adding text to the overall design. The edit software is conventional software that has been slightly modified to meet requirements of the system 100. Specifically the edit software includes such conventional features as "cut and paste", erasing, moving elements, etc. The print software permits the image developed on the system 10 to be printed by the printer 38. Lastly the auto format software function permits a selection of multiple images on a copy. For example, with regard to business cards an operator 12 may choose to print 12 business cards on a page (12 up), or other multiples depending upon the item being printed (e.g., 4 up, 6 up, etc.).

There are several options possible given the foregoing disclosure. For example, the color transfer unit 40 can be built integrally into the laser printer 38 or may be completely removable therefrom. It may also be possible to include several different rolls of foil 46 on a plurality of spindles permanently mounted in the color transfer unit 40 so that the operator 12 can automatically change colors on the fly. Different types of computers 102, scanners 104 and printers 38 may also be employed. For example, while a laser type printer 38 is included in the preferred embodiment, other types of printers capable of handling heat transferable toner would also be acceptable.

While the invention has been described with reference to a preferred embodiment thereof, it will be appreciative by those of ordinary skill in the art that various modifications can be made to the structure and steps of the invention without departing from the spirit and scope thereof.

We claim:

1. A foil printing apparatus controllable by a computer, said apparatus comprising:

laser printing means connectable to said computer for printing a printed image on a media; and, foil transfer means controllable by said computer for automatically transferring foil from a web of material having a transferable foil thereon onto at least part of said printed image, said foil transfer means including a means for supporting said web of material, a heatable roller and a pressure means for bringing said printed image on said media into pressurized contact with said web against said heatable roller, said pressure means including a pressure roller and an actuator for urging said heatable roller and pressure roller towards each other, wherein the pressurized contact of said pressure roller against said heatable roller causes the foil on said web to transfer to at least part of said printed image on said media.

2. The apparatus of claim 1 further comprising:
anti-flip means for preventing the trailing edge of said media from flipping and dislodging the printing thereon.

3. The apparatus of claim 2 further comprising:
(a) take up roller means for receiving said web of material after it has passed by said heatable roller; and,
(b) torque motor means for applying torque to said take up roller means thereby creating tension on said web.

4. The apparatus of claim 3 further comprising:
timer circuit means for controlling said torque motor means and for insuring even feeding of said web and for taking up slack and maintaining correct web tension.

5. The apparatus of claim 4 wherein said media comprises stiff roll stock and said anti-flip means comprises:
a first anti-flip means for preventing a depression of said stiff roll stock as it is fed into said foil transfer means; and,
second anti-flip means to prevent toner from becoming dislodged from stiff paper stock, said second anti-flip means being located up-stream of said first anti-flip means.

6. A method for automatically transferring foil onto a media comprising the steps of:
(a) printing a printed image on said media with a laser printer;
(b) detecting the presence of said media as it enters into a foil transfer area;
(c) presenting a web of material having a releasable foil layer thereon to said foil transfer area;
(d) bringing said web and said printed image into pressurized contact between two rollers, one of which is heated; and,
(e) maintaining the pressure between said two rollers for a predetermined period of time in response to the detection of the presence of said media as it enters said foil transfer area,
wherein said pressurized contact causes the foil on said releasable layer of said web to adhere to at least part of the printed image on said media.

7. The method of claim 6 further comprising the step of:
(f) repeating steps (b) through (e) in order to place other foil layers on printed portions of said media, but not upon portions of said media previously printed with foil.

8. The method of claim 7 further comprising the step of:

(g) guiding said media before it is printed with foil in such a way that the trailing edge thereof does not flip and disturb the printed image thereon.

9. A foil printing apparatus for printing on a media controllable by a computer, said apparatus comprising:
foil transfer means controllable by said computer for automatically transferring foil from a web of material having a transferable foil thereon onto said media, said foil transfer means including a means for supporting said web of material, a heatable roller and a pressure means for bringing said media into pressurized contact with said web against said heatable roller, said pressure means including a pressure roller and an actuator for urging said heatable roller and pressure roller towards each other, and
wherein the pressurized contact of said pressure roller against said heatable roller causes the foil on said web to transfer to said media.

10. The apparatus of claim 9 further comprising:
anti-flip means for preventing the trailing edge of said media from flipping.

11. The apparatus of claim 10 further comprising:
(a) take up roller means for receiving said web of material after it has passed by said heatable roller; and,
(b) torque motor means for applying torque to said take up roller means thereby creating tension on said web.

12. The apparatus of claim 11 further comprising:
timer circuit means for controlling said torque motor means and for insuring even feeding of said web and for taking up slack and maintaining correct web tension.

13. The apparatus of claim 12 wherein said media comprises stiff roll stock and said anti-flip means comprises means for preventing a depression of said stiff roll stock as it is fed into said foil transfer means.

14. A method for automatically transferring foil onto a media comprising the steps of:
(a) detecting the presence of said media as it enters into a foil transfer area;
(b) presenting a web of material having a releasable foil layer thereon to said foil transfer area;
(c) bringing said web and said printed image into pressurized contact between two rollers, one of which is heated;
(d) maintaining the pressure between said two rollers for a predetermined period of time in response to the detection of the presence of said media as it enters said foil transfer area,
wherein said pressurized contact causes the foil on said releasable layer of said web to adhere to said media.

15. The method of claim 14 further comprising the step of:
(e) repeating steps (a) through (d) in order to place other foil layers on said media, but not upon portions of said media previously printed with foil.

16. The method of claim 15 further comprising the step of:
(f) guiding said media before it is printed with foil in such a way that the trailing edge thereof does not flip.

17. A foil printing apparatus controllable by a computer, said apparatus comprising:
printing means connectable to said computer for printing a printed image on a media; and,
foil transfer means controllable by said computer for automatically transferring foil from a web of material having a transferable foil thereon onto at least part of said printed image, said foil transfer means including a means for supporting said web of material, a heatable roller and a pressure means for bringing said printed image on said media into pressurized contact with said web against said heatable roller, said pressure means including a pressure roller and an actuator for urging said heatable roller and pressure roller towards each other,
wherein the pressurized contact of said pressure roller against said heatable roller causes the foil on said web to transfer to at least part of said printed image on said media.

18. The apparatus of claim 17 further comprising:
anti-flip means for preventing the trailing edge of said media from flipping and dislodging the printing thereon.

19. The apparatus of claim 18 further comprising:
(a) take up roller means for receiving said web of material after it has passed by said heatable roller; and,
(b) torque motor means for applying torque to said take up roller means thereby creating tension on said web.

20. The apparatus of claim 19 further comprising:
timer circuit means for controlling said torque motor means and for insuring even feeding of said web and for taking up slack and maintaining correct web tension.

21. The apparatus of claim 20 wherein said media comprises stiff roll stock and said anti-flip means comprises:
a first anti-flip means for preventing a depression of said stiff roll stock as it is fed into said foil transfer means; and,
second anti-flip means to prevent the printed image from becoming dislodged from stiff paper stock, said second anti-flip means being located up-stream of said first anti-flip means.

22. A method for automatically transferring foil onto a media comprising the steps of:
(a) printing a printed image on said media;
(b) detecting the presence of said media as it enters into a foil transfer area;
(c) presenting a web of material having a releasable foil layer thereon to said foil transfer area;
(d) bringing said web and said printed image into pressurized contact between two rollers, one of which is heated; and,
(e) maintaining the pressure between said two rollers for a predetermined period of time in response to the detection of the presence of said media as it enters said foil transfer area,
wherein said pressurized contact causes the foil on said releasable layer of said web to adhere to at least part of the printed image on said media.

23. The method of claim 22 further comprising the step of:
(f) repeating steps (b) through (e) in order to place other foil layers on printed portions of said media, but not upon portions of said media previously printed with foil.

24. The method of claim 23 further comprising the step of:

(g) guiding said media before it is printed with foil in such a way that the trailing edge thereof does not flip and disturb the printed image thereon.

25. A foil printing apparatus controllable by a computer, said apparatus comprising:
   photocopier means connectable to said computer for printing a printed image on a media; and,
   foil transfer means controllable by said computer for automatically transferring foil from a web of material having a transferable foil thereon onto at least part of said printed image, said foil transfer means including a means for supporting said web of material, a heatable roller and a pressure means for bringing said printed image on said media into pressurized contact with said web against said heatable roller, said pressure means including a pressure roller and an actuator for urging said heatable roller and pressure roller towards each other,
   wherein the pressurized contact of said pressure roller against said heatable roller causes the foil on said web to transfer to at least part of said printed image on said media.

26. The apparatus of claim 25 further comprising:
   anti-flip means for preventing the trailing edge of said media from flipping and dislodging the printing thereon.

27. The apparatus of claim 26 further comprising:
   (a) take up roller means for receiving said web of material after it has passed by said heatable roller; and,
   (b) torque motor means for applying torque to said take up roller means thereby creating tension on said web.

28. The apparatus of claim 27 further comprising:
   timer circuit means for controlling said torque motor means and for insuring even feeding of said web and for taking up slack and maintaining correct web tension.

29. The apparatus of claim 28 wherein said media comprises stiff roll stock and said anti-flip means comprises:
   a first anti-flip means for preventing a depression of said stiff roll stock as it is fed into said foil transfer means; and,
   second anti-flip means to prevent toner from becoming dislodged from stiff paper stock, said second anti-flip means being located up-stream of said first anti-flip means.

30. A method for automatically transferring foil onto a media comprising the steps of:
   (a) printing a printed image on said media with a photocopier;
   (b) detecting the presence of said media as it enters into a foil transfer area,
   (c) presenting a web of material having a releasable foil layer thereon to said foil transfer area;
   (d) bringing said web and said printed image into pressurized contact between two rollers, one of which is heated; and,
   (e) maintaining the pressure between two rollers for a predetermined period of time in response to the detection of the presence of said media as it enters said foil transfer area,
   wherein said pressurized contact causes the foil on said releasable layer of said web to adhere to at least part of the printed image on said media.

31. The method of claim 30 further comprising the step of:
   (f) repeating steps (b) through (e) in order to place other foils layers on printed portions of said media, but not upon portions of said media previously printed with foil.

32. The method of claim 31 further comprising the step of:
   (g) guiding said media before it is printed with foil in such a way that the trailing thereof does not flip and disturb the printed image thereon.

* * * * *